US00RE44535E

(19) United States
(12) Reissued Patent
Zimmers et al.

(10) Patent Number: US RE44,535 E
(45) Date of Reissued Patent: Oct. 8, 2013

(54) ALERT NOTIFICATION SYSTEM

(71) Applicants: Steven L. Zimmers, Cincinnati, OH (US); Daniel W. Davis, Plant City, FL (US)

(72) Inventors: Steven L. Zimmers, Cincinnati, OH (US); Daniel W. Davis, Plant City, FL (US)

(21) Appl. No.: 13/645,222

(22) Filed: Oct. 4, 2012

Related U.S. Patent Documents

Reissue of:
(64) Patent No.: 8,150,925
Issued: Apr. 3, 2012
Appl. No.: 10/922,716
Filed: Aug. 20, 2004

U.S. Applications:
(62) Division of application No. 09/503,141, filed on Feb. 11, 2000, now Pat. No. 6,816,878.

(51) Int. Cl.
*G06F 15/16* (2006.01)
*G01W 1/00* (2006.01)

(52) U.S. Cl.
USPC ..... 709/206; 709/207; 709/200; 709/217; 702/3

(58) Field of Classification Search
USPC ..... 709/206, 207, 200, 217; 702/3; 340/426.18, 438, 463, 471, 506, 539.28
See application file for complete search history.

(56) References Cited

U.S. PATENT DOCUMENTS

| | | | | |
|---|---|---|---|---|
| 3,595,999 A | | 7/1971 | Cole | 179/6 D |
| 4,219,698 A | | 8/1980 | Birilli et al. | 179/5 P |
| 4,371,751 A | | 2/1983 | Hilligoss, Jr. et al. | 179/6 R |
| 4,811,382 A | | 3/1989 | Sleevi | 370/67 |
| 5,034,916 A | | 7/1991 | Ordish | 709/204 |
| 5,121,430 A | * | 6/1992 | Ganzer et al. | 380/258 |
| 5,260,986 A | | 11/1993 | Pershan | 379/57 |
| 5,515,421 A | | 5/1996 | Sikand et al. | 379/67 |
| 5,528,674 A | | 6/1996 | Reiss, III | 379/102 |
| 5,539,809 A | | 7/1996 | Mayer et al. | 379/67 |
| 5,541,980 A | | 7/1996 | Urewicz | 379/61 |
| 5,559,867 A | | 9/1996 | Langsenkamp et al. | 379/69 |
| 5,612,667 A | * | 3/1997 | Trumpy et al. | 340/425.5 |
| 5,663,734 A | | 9/1997 | Krasner | 342/357 |
| 5,825,283 A | | 10/1998 | Camhi | 340/438 |

(Continued)

OTHER PUBLICATIONS

*Zimmers and Davis* v. *The NTI Group, Inc,*. Complaint filed Jan. 28, 2008 in US District Court, Southern Distriction of Ohio, Western Division, Case No. 1:08CV0067.

(Continued)

*Primary Examiner* — Kristie Shingles
(74) *Attorney, Agent, or Firm* — Wood, Herron & Evans, LLP; Thomas W. Humphrey

(57) ABSTRACT

A system for providing alert notifications to multiple persons or to a plurality of related geographic locations. The system stores a database of information including a plurality of communications identifiers and additional information for subscribers having those identifiers, including geographic locations and/or school/organization membership information. The system responds to commands identifying alerts to be delivered to affected geographic areas or schools/organizations, by retrieving communications identifiers in the threatened geographic location or associated with the named school/organization, establishing a communications connection using each retrieved communication identifier, and delivering the alert. Alerts may be initiated by authorized personnel via telephone or Internet interaction with the system, or may be generated automatically from data feeds such as the EMWIN system of the National Weather Service. Alerts may be delivered via telephone, pager (voice or text), e-mail, Internet, or other media.

146 Claims, 24 Drawing Sheets

(56) References Cited

U.S. PATENT DOCUMENTS

| | | | | |
|---|---|---|---|---|
| 5,880,770 | A | 3/1999 | Ilcisin et al. | 348/14 |
| 5,910,763 | A | 6/1999 | Flanagan | 340/286.02 |
| 5,912,947 | A | 6/1999 | Langsenkamp et al. | 379/69 |
| 5,923,733 | A | 7/1999 | Binns et al. | 379/88.23 |
| 5,949,851 | A | 9/1999 | Mahaffey | 379/48 |
| 6,006,215 | A * | 12/1999 | Retallick | 1/1 |
| 6,018,699 | A | 1/2000 | Baron, Sr. et al. | 702/3 |
| 6,021,177 | A | 2/2000 | Allport | 379/48 |
| 6,112,075 | A * | 8/2000 | Weiser | 455/404.1 |
| 6,121,885 | A * | 9/2000 | Masone et al. | 340/628 |
| 6,169,476 | B1 | 1/2001 | Flanagan | 340/286.02 |
| 6,181,324 | B1 * | 1/2001 | Lamb et al. | 345/156 |
| 6,198,390 | B1 * | 3/2001 | Schlager et al. | 340/540 |
| 6,243,580 | B1 * | 6/2001 | Garner | 455/428 |
| 6,247,043 | B1 * | 6/2001 | Bates et al. | 709/200 |
| 6,255,953 | B1 * | 7/2001 | Barber | 340/601 |
| 6,275,774 | B1 | 8/2001 | Baron, Sr. et al. | 702/3 |
| 6,295,346 | B1 | 9/2001 | Markowitz et al. | 379/127.01 |
| 6,304,816 | B1 | 10/2001 | Berstis | 701/117 |
| 6,346,890 | B1 | 2/2002 | Bellin | 340/625.52 |
| 6,463,462 | B1 | 10/2002 | Smith et al. | 709/206 |
| 6,487,495 | B1 | 11/2002 | Gale et al. | 701/209 |
| 6,490,525 | B2 * | 12/2002 | Baron et al. | 702/3 |
| 6,492,912 | B1 * | 12/2002 | Jones | 340/994 |
| 6,493,633 | B2 | 12/2002 | Baron, Sr. et al. | 702/3 |
| 6,523,038 | B1 | 2/2003 | Iida et al. | 707/100 |
| 6,542,739 | B1 * | 4/2003 | Garner | 455/427 |
| 6,594,345 | B1 | 7/2003 | Vinson | 379/48 |
| 6,912,270 | B1 * | 6/2005 | Drury et al. | 379/51 |
| 7,031,438 | B1 * | 4/2006 | Cheston et al. | 379/88.14 |
| 7,092,509 | B1 * | 8/2006 | Mears et al. | 379/266.01 |
| 7,895,263 | B1 * | 2/2011 | Kirchmeier et al. | 709/203 |

OTHER PUBLICATIONS

*Zimmers and Davis* v. *National Notification Network LLC, 3N Global Inc. and 3N Global, d/b/a 3n* (*National Notification Network*), Amended Complaint filed Jun. 24, 2008 in US District Court, Southern Districtions of Ohio, Western Division, Case No. 1:08CV0067.

*Zimmers and Davis* v. *National Notification Network LLC, 3N Global Inc. and 3N Global, d/b/a 3n* (*National Notification Network*), Defendants' Original Answer filed Jul. 14, 2008 in US District Court, Southern Districtions of Ohio, Western Division, Case No. 1:08CV0067.

*3N Global, Inc.* v. *Zimmers and Davis,* Complaint for Declaratory Judgment filed Jun. 20, 2008 in US District Court, Central District of California; Case No. CV08-04095.

Auerbach, *Automatic Telephone Notification of Locations in a Tornado Path,* U.S. Patent Publication 2001/0052847 Published Dec. 20, 2001.

Auerbach, Mitchell J., *Emergency Management Communications System,* Provisional U.S. Appl. No. 60/111,281, filed Dec. 7, 1998.

Auerbach, Mitchell J., *Emergency Management Communications System,* Provisional U.S. Appl. No. 60/120,096, filed Feb. 16, 1999.

School Messenger Version 3.5 User Guide, Copyright 2003 Reliance Communications, Inc., 527 Scotts Valley Drive, Scotts Valley, CA 95066.

* cited by examiner

```
568
WFUS1 KIWX 010238
TOR IWX
INC141-INC099-010305
BULLETIN - EAS ACTIVATION REQUESTED
TORNADO WARNING
NATIONAL WEATHER SERVICE NORTHERN INDIANA
938 PM EST FRI OCT 16 1998
THE NATIONAL WEATHER SERVICE IN NORTHERN INDIANA HAS ISSUED A
* TORNADO WARNING FOR
SOUTHWESTERN ST JOSEPH COUNTY
EXTREME NORTHWESTERN MARSHALL COUNTY IN NORTH CENTRAL INDIANA
* UNTIL 1005 PM EST
* AT 934 PM EST...NATIONAL
WEATHER SERVICE DOPPLER RADAR INDICATED A
THUNDERSTORM WITH POSSIBLE TORNADO 2 MILES SOUTHEAST OF
WALKERTON...OR ABOUT 14 MILES WEST OF BREMEN...MOVING
NORTHEAST AT 40 MILES PER HOUR.
* SOME LOCATIONS AFFECTED...
WALKERTON
NORTH LIBERTY
SOUTH BEND
MISHAWAKA
IF YOU ARE CAUGHT OUTSIDE...SEEK SHELTER IN A NEARBY REINFORCED
BUILDING. AS A LAST RESORT...SEEK SHELTER IN A CULVERT...DITCH OR LOW
SPOT AND COVER YOUR HEAD WITH YOUR HANDS.
STAY TUNED TO NOAA WEATHER RADIO OR LOCAL MEDIA OUTLETS FOR THE
LATEST SEVERE WEATHER INFORMATION.
AFFECTED COUNTIES:
IN INDIANA: MARSHALL, ST JOSEPH.

END OF FILE
```

120 122 124 126 122 118

FIG. 2

ALERT NOTIFICATION SYSTEM

Matter enclosed in heavy brackets [ ] appears in the original patent but forms no part of this reissue specification; matter printed in italics indicates the additions made by reissue.

CROSS REFERENCE TO RELATED APPLICATIONS

This application is a divisional of U.S. application Ser. No. 09/503,141, filed Feb. 11, 2000, now U.S. Pat. No. 6,816,878 now allowed, which is hereby incorporated by reference herein in its entirety.

FIELD OF THE INVENTION

The present invention relates to the delivery of emergency information to persons needing to be notified of such information.

BACKGROUND OF THE INVENTION

Populations are increasing throughout the United States and globally. Population concentration increases the impact of localized emergencies such as weather, chemical spills, floods, etc., and thus increases the importance of notifying the public of emergency conditions in a timely manner.

Emergency services and public safety organizations have established technological systems that help to identify and communicate emergency situations. For example, emergencies may be centrally reported via 911 telephone communication systems, and disseminated via radio, satellite or Internet communications. Prediction methodologies have improved early detection of pending threats, particularly weather related threats such as tornadoes and floods, and communications networks have expanded to assist in the dissemination of this information. According to the National Weather Service (NWS) report "Reinventing Goals for 2000 Status—March 1999", the NWS requested $42.1 million in FY2000 for it's Natural Disaster Reduction Initiative (NDRI 2000) to continue to modernize and improve lead-times for severe weather events and expand the number of NOAA Weather Radio (NWR) stations. Forecasting and detection technologies, coupled with almost real-time distribution networks, have improved the average lead-time for severe weather events dramatically. Statistically, the NWS reports lead-time detections for thunderstorm events are currently 17.9 minutes. This is an improvement of 43% over the pre-modernization lead-time detection of 12.5 minutes for thunderstorms. Likewise, the improved tornado lead-time detection average is currently 11.0 minutes; improved by 162% over the pre-modernization lead-time average of 4.2 minutes. Furthermore, flash flood detections currently stand at 52 minutes of lead-time with an astounding improvement of 491%. Substantial increases in lead-time detection should contribute to more effective notification and ultimately more lives saved.

Although these improvements have provided greater accuracy and lead time in severe weather notifications, such notifications do not seem to be adequately communicated to citizens. Preliminary data as of Jul. 13, 1999 for the year 1999, shows that 99% of the total fatalities for tornadoes occurred during tornado watches. Statistics for 1998 similarly show 85% of all fatalities also occurred during tornado watches. Many of these fatalities could have been avoided if the persons involved had sought adequate shelter. This clearly indicates that there is a weakness in the existing infrastructure for notifying citizens of severe weather conditions. A review of this infrastructure and its shortfalls is thus in order.

Currently, the National Weather Service (NWS) collects and disseminates near real-time weather data to help identify and distribute alerts, watches and weather warnings for specific geographical regions around-the-clock over various distribution networks. For the cost of essential down link equipment, virtually anyone may receive nearly all this information at no charge. However, identifying what information is personally relevant does require the continuous sorting and digestion of the entire data stream 24 hours a day and seven days per week. Practically speaking, many individuals just have no need for the entire data stream. They just need to know when an emergency pertains to them specifically, no matter where they are and no matter what time of day. For this, people rely on local media organizations and government organizations to monitor and provide notification should an emergency occur. Many public and private entities currently receive this data stream, then parcel, process, categorize and sometimes enhance this information to rebroadcast over various distribution networks so local citizenry, populations and private industry may be alerted or informed. Nevertheless, the typical citizen must rely upon the vigilance of public and private media broadcasters to constantly monitor this data stream and get "the word out" in time of emergency.

To help provide additional insurance and improve the likelihood for notification, individuals can purchase a NOAA Weather Radio (NWR) receiver. NOAA Weather Radio (NWR) is a service of the National Oceanic and Atmospheric Administration (NOAA) of the U.S. Department of Commerce. As the "Voice of the National Weather Service", it provides continuous broadcasts of the current weather information as well as hazardous local environmental conditions. Furthermore, a NWR receiver can detect codes in a NWR broadcast indicative of hazardous weather conditions, and respond by producing a special alarm signal that is separate from normal playback of weather broadcasts.

Most NOAA weather stations broadcast 24 hours a day, but NWR coverage is limited by nature and design to an area within 40 miles of the transmitter. Those living in cities surrounded by large buildings and those in mountain valleys with standard receivers get little or no reception at considerably less than 40 miles. As of February 1998, approximately 70 to 80 percent of the U.S. population are capable of receiving NOAA Weather Radio broadcasts. Most recently, as a result of the "Gore Initiative", there has been 99 new NWR stations put into operation and funding is being sought for 100 new stations to ultimately achieve a 95% population coverage in each state. Thus, ultimately the system will leave at least 5% of the population unable to hear broadcasts or weather alerts.

Of course, the 95% coverage figure quoted in the previous paragraph, assumes that everyone within the coverage area of a NOAA Weather Radio transmitter has purchased a NWR receiver and will always have it turned on. Unfortunately, many people that actually own a NOAA Weather Radio often leave it unattended and unmonitored. There are several reasons for this, ranging from misuse of the equipment to discomfort with leaving any household appliance continuously on. Perhaps the most pernicious problem is that weather broadcasts must cover a relatively large area and so many of the alert signals transmitted by those broadcasts will be irrelevant to a large percentage of the listening population. For example, flood or tornado warnings are typically applicable only to listeners in a subsection of a particular county, while the remaining listeners are not in substantial danger. Unfortunately, however, all citizens that are tuned to the weather broadcast will hear the alert signal for every localized emergency. This results in the situation not unlike the fable of the Boy Who Cried Wolf, in which citizens decide that the warnings are not normally relevant, and either ignore them or turn their NWS receiver off. Most particularly, citizens often do not place a NWS receiver in their bedroom, because they would rather not be disturbed at night unless there is a certain life-threatening emergency. This perhaps explains why tornadoes and floods that occur at night are often the most deadly, because citizens do not receive emergency notifications.

Local municipalities have sometimes utilized civil defense siren systems to sound loud audible alerts in time of emergency to help capture the attention of urban residents. However, the sounding of an emergency siren can be confusing, requiring the notification recipient to seek additional information. The siren could mean a severe weather emergency, a chemical spill, volcanic eruption, a monthly system test or any other condition that local government decides to note (such as a "noon whistle"). Many citizens will, as a consequence, ignore such sirens rather than invest the time to determine their meaning. Furthermore, under the best conditions, the effectiveness of a siren is dependent upon proximity to the siren. Citizens that live near to the siren, live in poorly sound-insulated buildings, have normal hearing and/or are light sleepers, are much more likely to be notified of emergencies than citizens that live far from the siren, live in quiet buildings, are hearing impaired and/or are sound sleepers. As a consequence, it has been found that many people sleep right through nighttime siren alerts, and many severe weather fatalities are attributable to people just not hearing a siren. Further diminishing this system's effectiveness, many siren systems are over 50 years old and plagued with maintenance problems. Furthermore, sirens evidence spotty urban population coverage due to urban expansion that has outgrown system capacity.

Similar problems of notifying citizenry arise in non-weather related emergencies. For example, when there is a chemical spill or explosive threat, appropriate emergency services are dispatched to attempt to mitigate the impact to human health or property. Often, the full scope of the emergency can not be ascertained until emergency crews actually arrive at the scene. If the emergency has the potential to escalate and endanger more lives and other communities, emergency organizations must again rely on broadcasting for notification.

The United States Environmental Protection Agency (U.S. EPA) requires companies to develop Risk Management Program (RMP) plans. The required RMP plans describe chemical risks at industrial sites and the programs these facilities use to prevent accidental releases and minimize the impact on human health in the unlikely event that a release should occur. When applicable, the RMP includes air dispersion modeling to determine the potential off-site consequences of a release. Some HAZMAT (Hazardous Materials) vehicles also contain portable computers loaded with software to calculate and plot air dispersion modeling on an area map to accurately define impacted areas. These tools assist the identification and mitigation planning for fire departments and emergency responders during hazardous chemical releases. However, in order for these agencies to take appropriate actions, including ordering evacuation or sheltering-in-place, the agency must be able to achieve prompt community notification. Unfortunately, community notice of evacuation and sheltering-in-place, can only be achieved by broadcast notification and/or door to door notification. However, as noted above, broadcasting requires the attention of local citizenry, and furthermore, door-to-door notification is time consuming and potentially dangerous to emergency personnel.

As has been shown, current reliance upon local media and supplemental NWR broadcasts are insufficiently effective in notifying individuals when danger threatens life or property. Citizens must always have their TV on and they must be watching; or their radio must be turned on and they must be listening for a broadcast alert to be effective. There is thus a compelling need for an alert notification system that is designed to always be available whenever the need arises, a notification system that can not be turned off (short of termination of service). This system should not require the notification recipient purchase any additional equipment and the system should deliver an alert signal with which we have all been instinctively trained to respond. It is also important that the alert notification system have the ability to pinpoint, calculate and define dynamically all recipients with respect to their notification requirements then systematically notify those individuals (and only those individuals) within those defined geographic locations. The system must provide the notification quickly and accurately, with the ability to track the progress of the notification process and provide scenario resolution status until the notification scenario is completed or until the alert has expired.

SUMMARY OF THE INVENTION

The invention described in this patent application satisfies these fundamental needs. The invention builds from the recognition that virtually every office and home already includes a communication device that meets the above-stated requirements: it is always turned on, it produces a recognizable alert signal upon remote command, and citizens have been trained to respond to this signal under all circumstances. The device is the telephone. Utilizing principles of the present invention, anyone near to a telephone (including a wired or cellular telephone) can be notified of an emergency or alert that directly threatens or is of interest to him or her.

Although the specific embodiment of the invention described below is primarily directed to delivery of warnings via telephone, principles of the present invention are equally applicable to the use of other communications devices which may eventually become as popular as the telephone, such as computer networks, pagers, or other devices.

According to principles of the present invention, warnings such as weather or other emergency condition notifications, are provided to interested individuals by selecting from a database, communications identifiers (e.g., telephone/pager/facsimile numbers, computer network addresses such as Internet e-mail addresses or IP addresses), establishing communication connections using the identifiers, and then delivering an appropriate warning via the connection, which may or may not include information about where to find additional information.

In one disclosed embodiment, persons are selected in accordance with the physical location of the threat. To provide geographically-based notifications, the system registers the physical location for every communications identifier, based upon (among other possibilities) a county, city, area code, exchange, zip code, and/or global positioning coordinates (GPS). The degree of specificity used depends upon the specificity of the alert to a particular population or location. For example, storms will move with a particular trajectory and speed. A hazardous chemical fire will release a toxic cloud that will follow prevailing winds. The threat of a gas main explosion may require the evacuation notification with a specific mileage radius around one GPS coordinate or street address.

While the specific embodiment of the invention described below is primarily directed to geographically-based selection of communications identifiers, based upon identification of atmospheric conditions such as weather, toxic releases or other air quality conditions, principles of the present invention are equally applicable to delivering other kinds of warnings. For example, warnings of school closures, traffic conditions and other closures, interruptions or schedule changes can also be provided to interested parties in accordance with principles of the present invention. In such cases, the information registered for each communication identifier is sufficient to determine whether that identifier should be warned of a particular event, and when such an event occurs, and appropriate warning is delivered.

This system will thus "intelligently" provide notification to selected populations of citizens in a short period of time, based on specific criteria such as the location or type of situation, or the current or predicted movements of a threat. Furthermore, unlike the unsuccessful systems of the past, this system will track the notification process and call recipient responses, so it can then repeatedly attempt to notify all persons or locations until a response is registered, or the emergency expires or terminates based on a specific escalation scenario. This system can target specific locations or specific individuals, or both, based on the type of alert that is being generated. The system tracks every notification, recontacts failed attempts, automatically executes a specific execution scenario dependent upon the alert requirements and delivers specific emergency information. Importantly, the system leaves uninterested citizens undisturbed, thus avoiding a "Boy Who Cried Wolf" problem.

The above and other objects and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

FIG. 2 is a sample text file from EMWIN Data Stream.

DETAILED DESCRIPTION OF SPECIFIC EMBODIMENTS

Figure 1:
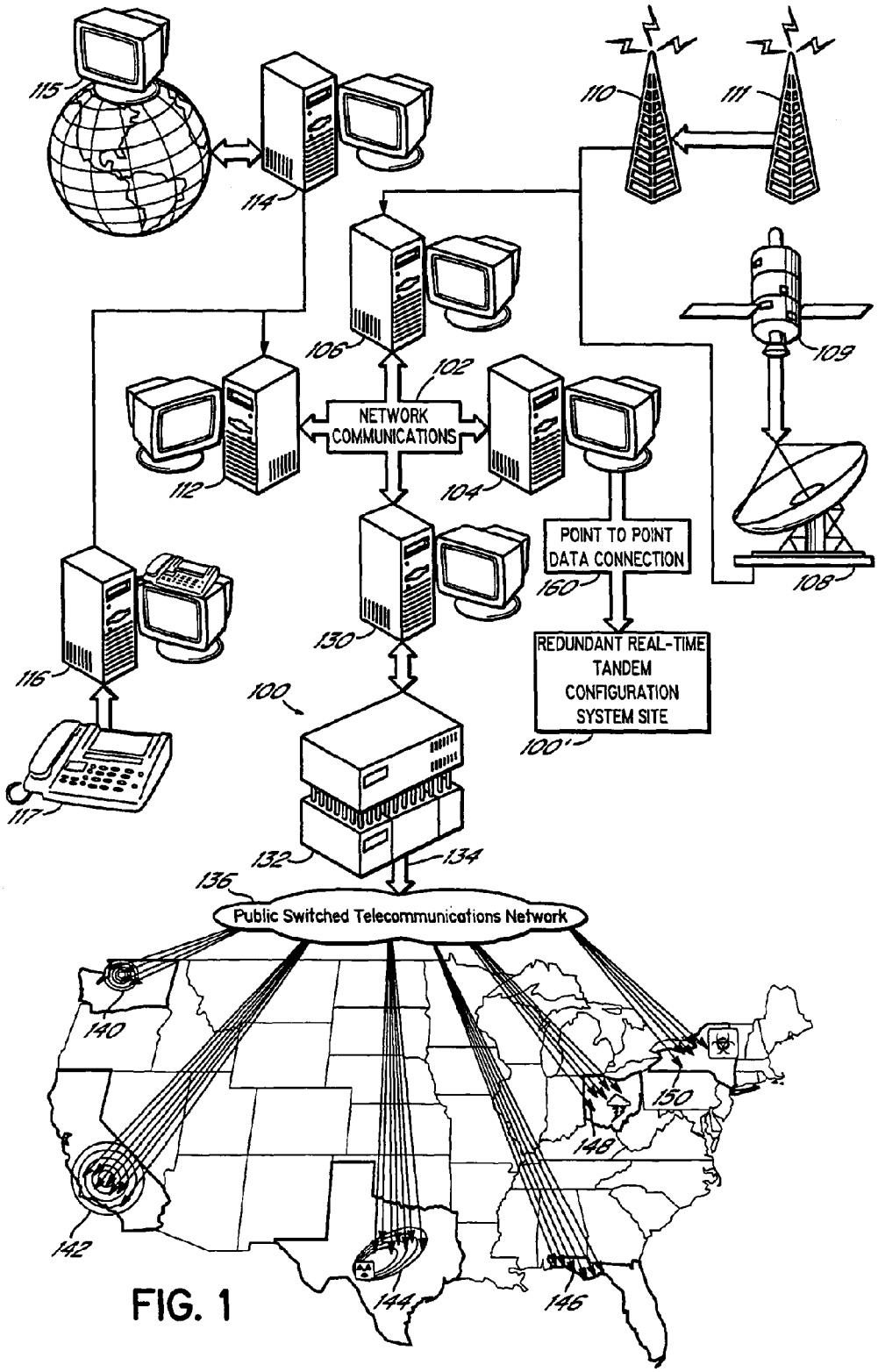
FIG. 1 is a diagram of a system in accordance with principles of the present invention, having facilities for detecting alert conditions and distributing alert notifications.

FIG. 1 illustrates an alert notification system in accordance with the principles of the present invention. At the core of alert notification system 100 is a network of computers connected via computer network connection 102.

The computers on network 102 include a database server 104 for storing a database of information detailed below in connection with FIGS. 3, 3A, 3B and 3C. This database is utilized by other systems on network 102 to evaluate alerts and to deliver alert notifications to appropriate persons.

Connected to database server 104 via network 102 are three additional computers. The first computer system is a Notification Parsing System 106, which is connected to a receiver 108 that receives continuous data feeds from a satellite 109 and/or is connected to a radio receiver (e.g., an FM receiver 110) that receives continuous data feeds from a radio transmitter 111. Notification parsing system 106 may be programmed to evaluate notifications delivered by any one of a variety of organizations via any one of a variety of communications mechanisms. For example, in addition to satellite and radio broadcasts, NPS 106 may also receive information via Internet dissemination. In the following description of an embodiment of the present invention, NPS 106 is responsible for receiving National Weather Service EMWIN data streams reporting weather conditions and other critical information. As further data streams become available via satellite, radio or Internet media, these additional data streams may be parsed by NPS 106 in a manner analogous to that described below.

Computer network 102 is also connected to a database query system 112. Database query system 112 interacts with database server 104 in response to messages received from other computers, to evaluate alert conditions and determine appropriate recipients of alert information. Database query system 112 receives data packets from notification parsing system 106 and from a web server 114 connected to the Internet 115, and from an IVR system 116 that can be contacted from remote telephones 117. These data packets take the form shown in Table I.

TABLE I

| Field Name | Size | Format |
|---|---|---|
| Notification Event | 9 | Numeric |
| Notification ID | 4 | Numeric |
| Priority Level | 2 | Numeric |
| State | 2 | Character |
| County | 3 | Numeric |
| City | 3 | Numeric |
| Zip Code | 9 | Numeric |
| Expiration Time | 8 | Time |
| Expiration Date | 8 | Date |
| Location Zip Code | 9 | Numeric |
| Location Latitude | 9 | Float |
| Location Longitude | 9 | Float |
| Radius | 3 | Numeric |
| GPS Coordinates | 9 | Numeric |
| Heading | 3 | Numeric |
| Speed | 3 | Numeric |
| Timeframe | 3 | Numeric |
| Bands | 2 | Numeric |
| School/Organization ID | 9 | Numeric |

As seen in Table I, data packets include a variety of fields each for identifying particular information. Notification event is a nine byte field holding a numeric value indicating the type of notification that is being delivered. Notification ID is a four byte field holding a numeric value uniquely identifying the notification so that it can be distinguished from others of the same type. Each notification event, therefore, can be uniquely identified and tracked through archived information, as discussed further below. Priority level is a two byte field storing a numeric value indicating the priority of the notification. All notifications will include notification event, notification ID and priority level values. Furthermore, all alerts will include an expiration time value in an expiration time field, stored as an eight byte time formatted value. Furthermore, all alerts will include an expiration date stored in an expiration date field, stored as an eight byte date formatted value.

The additional fields shown in Table I, are used to specifically identify the location or circumstances of the alert, and may not all be used in any given alert. A State field includes two bytes of characters, providing a state code for the location of the event. A County field includes a three byte numeric value identifying a particular county. A City field includes a three byte numeric value identifying a city, and a Zip code field includes a nine byte numeric value identifying a zip code. An alert relating to a specific geographic location, such as a static area alert, will include one of a state, county, city or zip code value which will geographically reference the static area to which the alert applies.

Radius alert events are identified by reference to a specific geographic location and radius surrounding that location. For these events, a latitude and longitude will be stored in a location latitude field and a location longitude field, both of which carry nine byte floating point numeric values. As an alternative to a latitude and longitude, a radius event may store global positioning system (GPS) coordinates as a nine byte numeric value in a GPS coordinates field. Radius events will also store a radius value in a radius field as a three byte numeric value.

Vector alerts identify an area to be alerted utilizing a vectorized description of the location of the condition. These alerts will identify a heading in three byte numeric heading field, a speed in three byte numeric speed field and a time frame in a three byte numeric time frame field. Furthermore, for the purposes of processing these alert conditions, vector related alerts will also identify a number of bands used in processing the alert; this number of bands will be stored as a two byte numeric value. Vector related alerts will also include location information, for example, one of a zip code, latitude and longitude or GPS coordinate value.

Shoreline or river related alert notifications will carry information similar to static area alert notifications, i.e., a state, county, city and zip code identity.

A last category of alert is a school/organization alert, used to notify students/parents of a school cancellation/emergency or analogously notify members of an organization of a cancellation/emergency or schedule change. To facilitate such alerts, a School/Organization ID field holds a nine byte numeric value identifying a school (or school district) or organization. A school or organization related alert will identify the subscribers needing notification, using the school/organization ID number stored in this field.

Alerts are received by database query system 112 through a variety of channels and take different forms. Weather related alerts including flood alerts and other alert conditions identified by the National Weather Service are provided by notification parsing system 106 to database query system 112.

Referring to FIG. 2, it can be seen that a text file 118 produced from the EMWIN data stream includes a number of fields that can be readily parsed by notification parsing system 106. The first line "WFUS1 KIWX 010238" is a "WMO" header that includes a 4-6 character product identifier, a 4 character source site code, and a GMT formatted 6-digit origination time. The subsequent lines of the EMWIN data stream include text information and codes, as well as, in some cases, graphic files and other data. Detailed information on the format of the EMWIN data streams is available from NOAA, e.g. from the URL http://www.nws.noaa.gov/oso/cominfo.shtml.

Each EMWIN file includes prefix codes identifying a particular event that is the subject of the notification. As can be seen in FIG. 2, the notification code of TOR 120 in the second line of the file, is used to identify a tornado warning. Notification parsing system 106 identifies this product code and uses it to generate an appropriate packet utilizing the format of Table I. Notification parsing system 106 also parses the remainder of the text file to identify geographic locations. These may be coded using "Universal Generic Code", e.g., including the county identifiers INC141 and INC099 (or the subsequent text 122 shown in FIG. 2, which identify St. Joseph County and Marshall County in north central Indiana. County identifiers are coded using the Federal Information Processing Standard (FIPS 6-3), under which each county has a 3-digit identifier. The identified county information can be enhanced by parsing the subsequent text, which as shown at 122 indicates that the alert condition is specifically for southwestern St. Joseph County and extreme northwestern Marshall County.

Furthermore, notification parsing system 106 may identify heading information such as, at 124, the text indicating that the tornado is moving northeast at 40 mph. The alert time and alert ending time information, available in GMT format ("010238" and "010305"), and in a text format, can be used to identify a time period for the alert. Notification parsing system 106 may also utilize the listing of affected towns at 126 to identify zip codes of those locations and thereby produce alert notifications based upon zip codes. Furthermore, the body of the NWS message may also be inserted into a facsimile message, sent as an electronic mail message, read via a computer-generated voice over the telephone, or forwarded to a text pager.

Table II, appearing below, summarizes the prefix codes utilized in EMWIN data streams and the meanings of those prefix codes. Each particular type of alert will be converted to alert messages if an appropriate type can be gleaned from one or a collection of EMWIN data stream segments.

TABLE II

| Prefix | Name |
|---|---|
| AFD | Area Forecast Discussion |
| AIR | Upper Air (Data) |
| APT | Polar Orbiter Images |
| ASH | Volcanic/FIRE Warnings and reports |
| AWS | Area Weather Summary |
| CEM | Civil Emergency Message |
| CFW | Coastal Flood Warning |
| CHT | Charts DIFAX/WEFAX |
| CLI | Climate Reports |
| CMP | Composite Images(CMPALLUS.GIF) |
| CMP | Compressed Files (CMPMxxxx.ZAG) |
| CWF | Coastal Waters Forecast |
| DY1 | Day One Convective Outlook |
| DY2 | Day Two Convective Outlook |
| ELN | El 'Nino images |
| EMA | Emergency manager activation msg. |
| EML | Email (wireless) |
| EPH | Ephemeris data for satellite orbits |
| EQR | Earthquake Data |
| ESF | Flood Potential |
| ESS | Water Supply Forecast |
| FAA | Aviation Reports (Pilot briefs) |
| FEE | Feedback to all users |
| FFW | Flash Flood Warning |
| FFA | Flash Flood Advisory |
| FFS | Flash Flood Statement |
| FLN | National Flood Summary |
| FLW | Flood Warning |
| FWF | Fire Weather Forecast |
| GLF | Great Lakes Forecast |
| GLO | Great Lake Outlook |
| GLS | Great Lakes Summary |
| GMS | GMS Satellite Images |
| GO9 | GOES 9 Satellite Images |
| G10 | GOES 10 Satellite Images |
| GPH | Graphic Files (AFOS Graphics) |
| HAA | Hurricane Probabilities Atlantic |
| HAD | Hurricane Discussion Atlantic |
| HAF | Hurricane Forecast Advisory Atlantic |
| HAM | Hurricane NCEP Model Comparison Atlantic |
| HAP | Hurricane Public Advisory Atlantic |
| HAS | Hurricane Monthly Summary Atlantic |
| HAT | NCEP Tropical Discussion Atlantic |
| HAW | Tropical Weather Outlook Atlantic |
| HEA | Hurricane Probabilities East Pacific |
| HED | Hurricane Discussion East Pacific |
| HEF | Hurricane Forecast Advisory East Pacific |
| HEM | Hurricane NCEP Model Comparison East Pacific |
| HEP | Hurricane Public Advisory East Pacific |
| HES | Hurricane Monthly Summary East Pacific |
| HET | NCEP Tropical Discussion East Pacific |
| HEW | Tropical Weather Outlook East Pacific |
| HFF | High Seas Forecast |
| HLS | Hurricane Local Statement |
| HNA | Hurricane Probabilities North Pacific |
| HND | Hurricane Discussion North Pacific |
| HNF | Hurricane Forecast Advisory North Pacific |
| HNM | Hurricane NCEP Model Comparison North Pacific |
| HNP | Hurricane Public Advisory North Pacific |
| HNS | Hurricane Monthly Summary North Pacific |

TABLE II-continued

| Prefix | Name |
|---|---|
| HNT | NCEP Tropical Discussion North Pacific |
| HNW | Tropical Weather Outlook North Pacific |
| HSA | Hurricane Probabilities South Pacific |
| HSD | Hurricane Discussion South Pacific |
| HSF | Hurricane Forecast Advisory South Pacific |
| HSM | Hurricane NCEP Model Comparison South Pacific |
| HSP | Hurricane Public Advisory South Pacific |
| HST | NCEP Tropical Discussion South Pacific |
| HSS | Hurricane Monthly Summary South Pacific |
| HSW | Tropical Weather Outlook South Pacific |
| HWA | Hurricane Probabilities West Pacific |
| HWD | Hurricane Discussion West Pacific |
| HWF | Hurricane Forecast Advisory West Pacific |
| HWM | Hurricane NCEP Model Comparison West Pacific |
| HWP | Hurricane Public Advisory West Pacific |
| HWS | Hurricane Monthly Summary West Pacific |
| HWT | Hurricane NCEP Tropical Discussion West Pacific |
| HWU | Hazardous Weather Update |
| HWW | Tropical Weather Outlook West Pacific |
| HTM | HTML Documents |
| ICE | Ice Statement |
| IMG | General Images (IMGALLUS.GIF) |
| INT | International Overviews |
| LFP | Local Forecast |
| LGT | Lightning Images |
| LSH | Lake Shore Forecast |
| LSR | Local Storm Report |
| MET | Meteosat Images |
| MIS | Miscellaneous Products |
| MOD | Model Run Images |
| MWS | Marine Weather Statement |
| NAH | Agriculture Products (Intn'l/National) |
| NSH | Near Shore Forecast |
| NOW | NOWcasts (Short Term Forecast) |
| NPW | Non-precipitation Warning |
| NWX | National Weather Summary |
| OFF | Offshore Forecast |
| OMR | Other/Offshore Marine Reports |
| PAA | Pager Messages |
| PNS | Public Information Statements |
| PRO | Propagation Reports |
| PSR | Post Storm Report |
| RAD | Radar Images (RADALLUS.GIF) |
| REC | Recreation Forecasts |
| RER | Record Event Reports |
| RFW | Red Flag Warning (Fire Warning) |
| RVA | River Summary |
| RVR | River Forecast |
| RVS | River Statement |
| RWS | Regional Weather Summary |
| SAH | Surface Observations (Data) |
| SAO | SAORCMUS.TXT Contains RCM's |
| SAW | Selected Area Watches |
| SCS | Selected cities (scs11-scs14) |
| SEL | Watch areas |
| SES | Seismic/Earthquake Images |
| SFD | State Forecast Discussion |
| SFP | State Forecast |
| SHP | Live Ship Reports |
| SIX | Six to Ten day outlook |
| SLS | Areal update |
| SKY | SKYWARN Activation Message |
| SMW | Special Marine Warning |
| SPS | Special Weather Statement |
| STP | State Temp & Precip Reports |
| SUM | State Weather Summary |
| SVR | Severe Thunderstorm Warning |
| SVS | Severe Weather Statement |
| SWO | Severe Weather Outlook |
| SWR | State Weather Roundup |
| SWX | Space Weather (solar activity) |
| SYS | System messages |
| TAF | Aviation Terminal Forecasts/airports |
| TID | Tide Data |
| TOR | Tornado Warning |
| TRK | Tracking Files (storm tracks) |
| TSU | Tsunami |
| TVL | Travelers Forecasts |

TABLE II-continued

| Prefix | Name |
|---|---|
| UVI | National Ultra-Violet index |
| WSW | Winter Storm Warning |
| WWA | Weather Watch |
| ZFP | Zone Forecast |

Returning now to FIG. 1, in addition to the EMWIN system, alert conditions may also be identified by individuals authorized to initiate the delivery of alerts through the alert notification system 100. Authorized individuals may include civil defense authorities in the case of civil emergencies, school administrators in the case of school related alerts, and managerial employees of business or community organizations that wish to utilize the system of FIG. 1 via organization alerts.

Alerts initiated by these authorized individuals may be delivered to the system 100 via an interactive voice response system 116 which can be accessed via any telephone. Alerts may also be delivered via an Internet connection, for example using a World Wide Web browser connected via hypertext transfer protocol (HTTP). In this case, connections are made through the Internet to web server 114 to generate an alert message.

Alerts generated using web server 114 or IVR server 116 are delivered to database query system 112 through packets which are also formatted in accordance with Table I. Database query system 112 then identifies subscribers to be individually alerted, and then alert notifications are delivered to subscribers, via telephone, via facsimile, via electronic mail or via other electronic communications.

Telephone and facsimile alerts are delivered to subscribers through a switch host computer 130 and a host controllable switch 132. Switch host computer 130 is connected to host controllable switch 132. Switch 132 is a host controllable switch that interfaces with digital telephone lines 134 of a telecommunications carrier to permit outbound telephone calls to be generated at a high volume, to be delivered to subscribers to the system 100. Outbound telephone calls from host controllable switch 132 are routed through the public switched telecommunications network 136 to telephones subscribed in system 100, such as wired telephones at private homes and businesses, as well as cellular telephones. Outbound telephone calls from host controllable switch 132 may also connect to facsimile machines to deliver facsimile alert messages.

As can be seen in FIG. 1, switch host 130 and host controllable switch 32 can be utilized to handle multiple alerts from multiple locations simultaneously. As can been seen in FIG. 1, an evacuation alert using a radius pattern is being delivered to a region 140 in the state of Washington; simultaneously, an alert related to an earthquake warning is being delivered to a region 142 in the state of California; a radiation leak wind dispersion alert is being delivered to a region 144 in the state of Texas; a flood or high wave condition alert is being delivered to a shoreline region 146 in the state of Florida; a weather alert is being delivered to a region 148 in the state of Ohio; and a biohazard related alert is being delivered to a region 150 in upstate New York.

The system illustrated in FIG. 1 is scalable such that any quantity of alerts to any geographic regions can be handled by simply enhancing the capacity of host controllable switch 132. Such enhancement is within the knowledge of those of skill in the art of telephony. Accordingly, a nationwide or even global alert notification system can be implemented at a single geographic location using the principles of the present invention.

To ensure high reliability and robustness, in accordance with the principles of the present invention, the system 100 may be redundantly positioned at multiple geographical locations. Thus a second redundant real time tandem system 100' with an analogous configuration, may be located at a separate geographic location and connected via a point to point data connection 160 to the system 100 illustrated in FIG. 1. Systems 100 and 100 are in continuous communication over point to point link 160 to insure that all alert notifications are received by both systems, and thereafter one system is tasked with handling each notification. The systems also continuously communicate to maintain synchronization of the databases handled by the respective database servers of the respective systems. In the event of a failure at one of the tandem systems, all existing requests for alert notification will be handled by the other system to insure that the alerts are delivered appropriately in spite of the network failure.

As noted above, telephone and facsimile communications are delivered to telephone and facsimile machines via host controllable switch 132. Alert notifications may also be delivered via electronic mail or other Internet communication methodologies. In this case, the alert notification is handled by web server 114. In such a scenario, database query system 112 instructs web server 114 to deliver the alert notification, and in response web server 114 connects via its Internet connection to the appropriate location to deliver the alert.

Table III, which appears below, illustrates the format of packets transferred from database query system 112 to switch host 130 and web server 114 to cause an alert to be delivered.

TABLE III

| Field Name | Size | Format |
|---|---|---|
| Priority Level | 2 | Numeric |
| Notification Event | 9 | Numeric |
| Station ID | 30 | Character |
| Station ID Type | 2 | Numeric |
| Message ID 1 | 4 | Numeric |
| Message ID 2 | 4 | Numeric |
| Message ID 3 | 4 | Numeric |
| Message ID 4 | 4 | Numeric |

As seen in Table III, packets sent from database query system 112 include fields for specifically identifying the recipient of an alert and the type of the alert. The first field, "priority level" includes a two byte numeric value indicating a relative priority of the alert message. This value is derived from priorities assigned to alerts delivered to database query system 112 by notification parsing system 106 or web server/IVR system 114, 116. A second field, "notification event", includes a nine byte numeric value having a numeric code for the type of alert that is being delivered. A third field, "station ID" includes a 30 byte character value that identifies the recipient of the alert notification. In the event that the alert is being delivered via telephone or facsimile, the station ID field will include a telephone number. In the event that the alert is being delivered via electronic mail or the Internet, the station ID will include an electronic mail address or a uniform resource location (URL) indicating where the alert is to be delivered. A "station ID type" field includes a two byte numeric value identifying the type of station ID that is provided in the preceding field. Thus alerts to telephones can be distinguished from alerts to facsimile machines, from alerts to electronic mail addresses and from alerts to other IP or similar computer network addresses.

After these fields are four message ID fields, each of which is a four byte numeric value. These fields contain a code for a message to be delivered to the subscriber/recipient of the alert. Multiple messages may be delivered simultaneously; to facilitate this, four message IDs may be supplied in single packet as illustrated in Table III. The message IDs may be an index usable by host controllable switch 132 to retrieve a voice message to be delivered via telephone, or may be an index to a prestored facsimile message to be delivered to a facsimile machine. In the case of alert notifications to be delivered to email or Internet addresses, each message ID will be an index to prestored text for the email message or prestored text or other actions to be performed at a web site or other resource accessible via the uniform resource locator.

Figure 3:
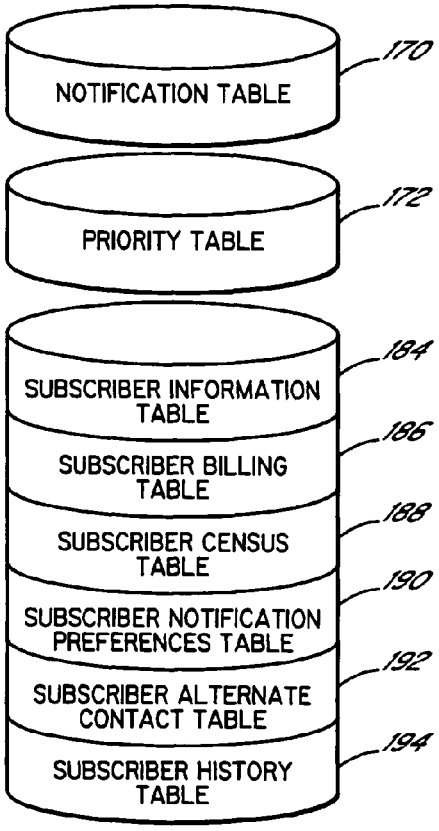
FIG. 3 is an illustration of the database tables used by the system of FIG. 1, and FIGS. 3A through 3C are detailed illustrations of each of the tables in the database.

Referring now to FIG. 3, the databases utilized by the system of FIG. 1 are generally illustrated. These databases are stored and managed by database server 104. Notification parsing system 106 and database query system 112 retrieve data from these databases as needed to perform the functions discussed generally above and elaborated below.

Tables 170 and 172 managed by database server 104 are used by notification parsing system 106 in parsing EMWIN data streams from the National Weather Service. The notification parsing system 106 parses data received from these data feeds to identify text, graphic and image files. Each file is then processed to determine its file type. The file types listed in Table I are stored in notification table 170.

Figure 3A:
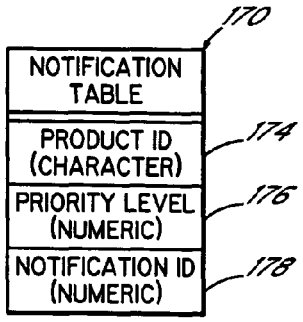

The detailed format of notification table 170 is shown in FIG. 3A. Each record of the notification table 170 includes a product ID field 174 which is a three byte character value in the formats shown in Table I above. A second field 176 stores a two byte numeric value identifying a priority level for the product or event type represented by the record. A third field 178 stores a 4 byte numeric value providing a notification identifier associated with the product represented by the record. The notification identifier maps to one of the predefined notifications handled by the system, and is used when delivering a corresponding packet in the format illustrated in Table II from the notification parsing system to the database query system.

Figure 3B:
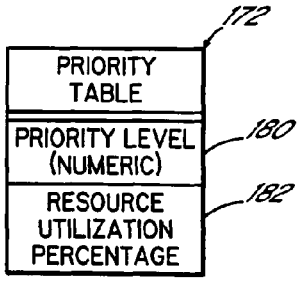

FIG. 3B illustrates a priority table 172 which provides specific information about priority levels identified in field 176 of the notification table 170. Each record in the priority table 172 includes a priority level field 180 for storing a two byte numeric value identifying a priority level. Each priority table record includes a resource utilization field 182 for storing a percentage value indicating the amount of resources of the system that are to be consumed for an alert at the identified priority level. The resource utilization percentage identified in field 182 is used in determining the extent to which a given alert should be allowed to consume all of the computational resources of database query system 112 and/or switch host 130 and line capacity of host controlled switch 132.

FIG. 3 also illustrates a variety of subscriber related tables 184, 186, 188, 190, 192 and 194. These tables are used to store information relating to subscribers to permit database query system 112 to identify specific subscribers to receive alert notifications in response to packets received from web server 114, IVR system 116 or notification parsing system 106.

Figure 3C:
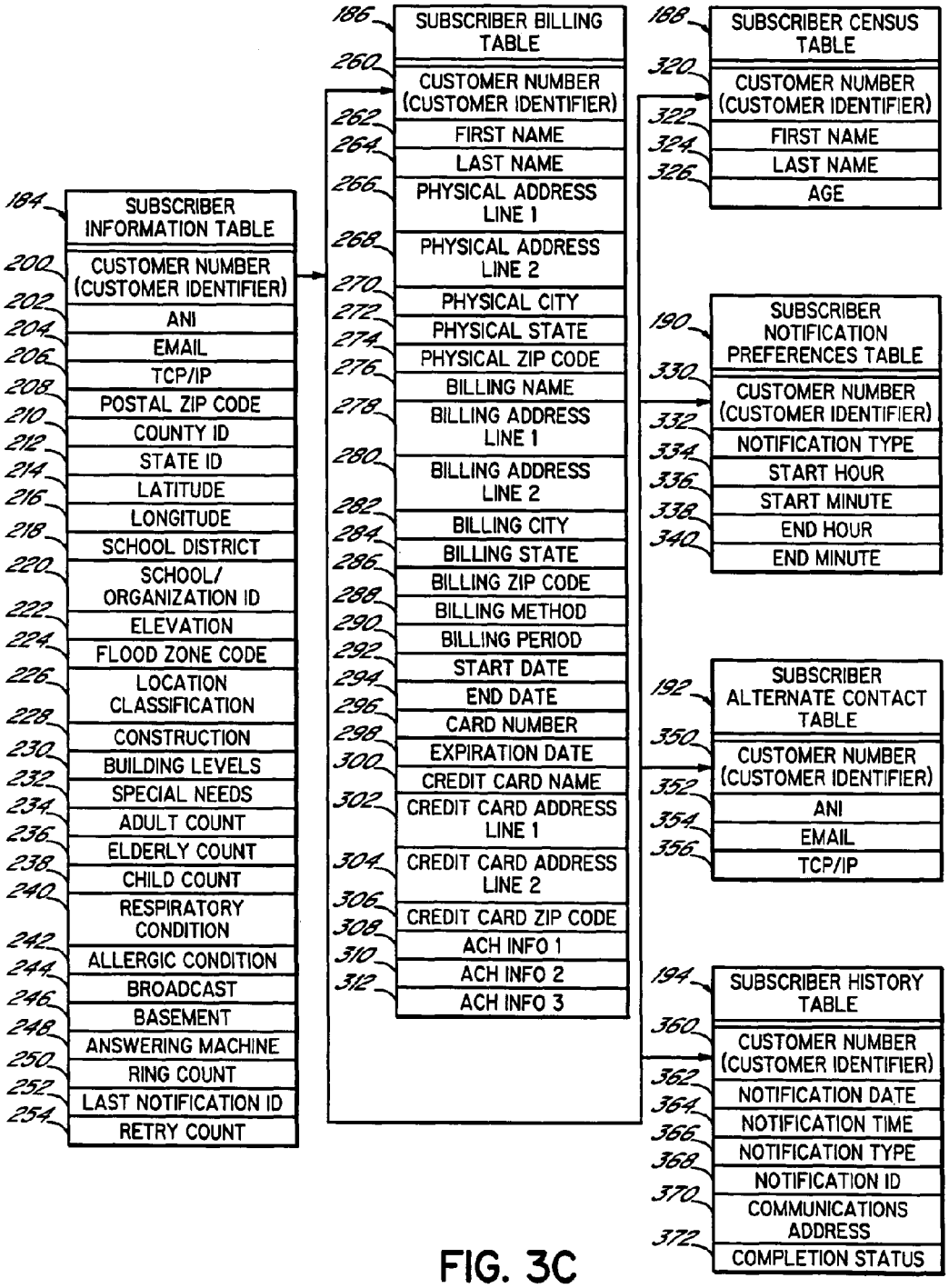

Referring now to FIG. 3C, the schema of these tables 184-194 can be viewed in detail.

The subscriber information table 184 includes information regarding a subscriber that is useful for determining whether that subscriber should be notified of an alert condition. Each record in the subscriber information table 184 includes a field 200 providing a customer number or customer identifier for this subscriber. This unique identifier is used to link information about a subscriber in table 184 to information about the same subscriber in the other tables 186, 188, 190, 192 and 194. Subscriber information table 184 also includes extensive information regarding the subscriber to be used in contacting the subscriber. For example, a field 202 is used to store a telephone number or ANI used to contact the subscriber. A field 204 includes an electronic mail address for the subscriber. A field 206 includes an Internet, i.e., TCP/IP address for the subscriber. Typically a subscriber will have only one mode of contact, i.e., only one of the three fields 202, 204 and 206 will include a value. However, a subscriber may also have multiple modes of contact registered (see table 192, discussed below) in which case the appropriate mode of contact is chosen based upon the priority of the alert, the type of the alert or subscriber preferences.

Continuing on the subscriber information table 184, the table includes fields for identifying information regarding the subscriber that can be used to determine whether the subscriber ought to be notified of a given alert condition. These fields include a field 208 for storing a postal zip code for the subscriber, a field 210 for storing the county identifier for the subscriber, a field 212 for storing a state identifier for the subscriber and a field 214 and a field 216 for identifying a latitude and longitude for the subscriber. Fields 208 through 216 identify at varying levels of specificity the geographic location of the subscriber so that the subscriber can be selected for receipt of a notice under the appropriate conditions. Other information may also be used to determine whether a subscriber should be contacted. For example, a school district name and a school organization ID are stored in fields 218 and 220 to affiliate the subscriber with a school or organization that may need to inform pupils or organization members of cancellations or changes utilizing the alert notification system of the present invention. A field 222 is used to store an elevation at the subscriber's location and a field 224 is used to store a flood zone code for the subscriber. These fields will be used to identify whether the subscriber is subject to alert notifications relating to floods or weather conditions that only affect certain elevations or flood zones. A field 226 may also be used to classify the location of the subscriber in other ways, for example nearness to open space or trees where wind damage may be more likely, or location within an office building at which shelter may be more difficult to find. A field 228 includes coding relating to the construction of any building associated with the subscriber. A field 230 is used to identify the number of levels in the building associated with the subscriber. Fields 228 and 230 can be used together to prioritize the danger to a subscriber arising from a weather condition or any other condition that may be more dangerous to some forms of building construction or some heights of buildings. A field 232 is used to generally classify any special needs of the subscriber that may be applicable in determining the priority to be given alerting the subscriber of conditions monitored by the system. These conditions may include the need to use a wheelchair or personal assistance to seek shelter in the basement of the subscriber's location. Fields 234, 236, 238 provide an indication of the number of persons potentially at risk at the location identified in the record. Field 234 provides a count of adults at that location, field 236 provides a count of the number of elderly persons in that location and field 238 provides a count of the number of children in that location. Alert notifications may be prioritized to reach the largest population of persons most rapidly or may be prioritized to reach locations where there are children or elderly citizens more rapidly in order to provide the required additional time to take shelter. Additional fields 240 and 242 are used to determine whether a subscriber should receive priority for atmospheric condition alerts, or is interested in such alerts at all. Field 240 indicates that a subscriber has a respiratory condition of the kind that would be affected by ozone alerts or other respiratory-related weather conditions that may adversely impact only those members of the population with respiratory conditions. A field 242 will be used to identify allergic conditions of persons at this subscriber location such that alert notifications may be provided to indicate the presence of allergens of a particular kind in the atmosphere. A field 244 indicates whether the subscriber location is capable of receiving broadcasts of weather or other alert information. The subscriber may be placed in a higher priority if the subscriber is not able to receive alert notifications via other broadcast media. The field may also indicate that the subscriber is, itself, a "broadcaster", i.e., a party that relays alert information to further persons. A "broadcaster" is also provided with enhanced priority to assist in fulfilling broadcast responsibilities and to ensure the greatest number of persons are notified of the alert as soon as possible. Field 244 may also be used to "brand" the alert notification, e.g. by identifying a broadcast station that sponsors the delivery of the alert notification, so that subscribers develop goodwill for the sponsoring station and turn to that station for additional information. A field 246 indicates whether a basement is available at the subscriber location aiding and prioritizing subscribers who do not have access to sufficient shelter over other subscribers who do have access to sufficient shelter within their own homes. This, for example, would allow alerts to be delivered first to mobile home parks and other (high risk) areas that are particularly susceptible to other damage. A field 248 indicates whether the subscriber location has an answering machine and a field 250 indicates the ring count for the answering machine. These fields are used to avoid leaving a message on an answering machine or voice mail service if there is such a service in use at the subscriber's location. The ring count is used to ensure that the host controlled switch will disconnect prior to reaching the identified number of rings, so that the answering machine or voice mail system will not pick up the line. As a consequence, the subscriber's location will be called repeatedly until an answer is received, thus ensuring that the alert message is delivered to a person rather than to an answering machine or voice mail system.

The final two fields 252 and 254 are useful in managing the delivery of information to the subscriber. Specifically, field 252 stores the identifier for the last notification that was provided to the subscriber's location, and can be used as a confirmation that a notification was given to the subscriber with respect to that condition. A retry count found in field 254 is used to control the number of times a subscriber location is contacted to attempt to deliver emergency information. A subscriber may wish to set a retry count value based upon preference and knowledge of the subscriber's ability to consistently answer telephone calls during a known period of time.

The subscriber billing table 186 stores information used in invoicing a subscriber for services provided by the alert notification system. A field 260 in the subscriber billing table 186 is used to store a customer number, i.e., customer identifier for a subscriber to thereby relate the subscriber to the other tables illustrated in FIG. 3C. A subscriber billing table 186 provides information needed to appropriately bill a subscriber for services provided by the system. These fields include a field 262 for storing a first name, a field 264 for storing last name, fields 266 and 268 for storing two lines of physical addresses for the subscriber, a field 270 for a city, a field 272 for a state and a field 274 for a zip code. Additional fields are used to provide a billing address if needed for the subscriber including a field 276 for name, fields 278 and 280 for a billing address, a field 282 for a city, a field 284 for a state and a field 286 for a zip code. A field 288 identifies a billing method preferred by the subscriber, such as advance invoicing or alternatively automatic payments via credit card. A field 290 identifies the billing period preferred by the subscriber, such as weekly, monthly or annually. Discounts may be provided for prepayment of large subscription periods. Fields 292 and 294 identify starting and ending dates for service provided by the system during a current billing period. Fields 296 and 298 provide a credit card number and expiration date to be used in billing the subscriber. Fields 300, 302, 304 and 306 provide name and address information for a credit card to be used in billing the subscriber in advance via credit card. This information must be stored to insure payment by the credit card company for charges billed. Fields 308, 310 and 312 store automated clearinghouse (ACH) information for the customer, which may be used to generate ACH transactions to automatically invoice the customer for payments for services provided by the system.

Subscriber census table 188 stores information relating to persons at the location identified in the subscriber information table 184. Subscriber census table records include a field 320 for storing customer identifier to link the record to subscriber information in subscriber information table 184. Subscriber census table 188 also includes fields 322 and 324 for storing a first and last name for a subscriber, and an age field 326 for storing an age of a subscriber. It will be appreciated that a given subscriber location may be inhabited by multiple persons in which case there are multiple subscriber census table 188 entries, one for each person, so that information about the multiple persons may be stored and retrieved and used to customize alerts. Furthermore, subscriber census information can be used to provide census data to emergency agencies via telephone, facsimile, e-mail, or other media. This information can facilitate rescue efforts and further define the impact of an emergency condition on local emergency response services. For example, in the case of an explosion, census information can be used to define population impact, aid in targeting the search for survivors, and defining an evacuation scale. For the case of a biohazardous condition, census information can aid in defining the amount of medical services that will be consumed in treating victims.

Subscriber notification preferences table 190 is used to identify preferences of a subscriber with respect to notifications by the system. A field 330 is used to store a customer identifier to link the preferences identified in table 190 in the subscriber information table 184. Additional fields in the subscriber notification preferences table 190 include a field 332 for storing a notification type and fields 334 and 336 for identifying a start hour and minute and fields 338 and 340 for identifying an ending hour and minute. A record in subscriber notification preferences table 190 can be used to identify the hours during which an alert notification should be sent to a given subscriber location. Thus, a subscriber may request that atmospheric condition alerts that are not immediately hazardous, such as ozone alerts, not be notified to their home location during the nighttime when residents of the home will be sleeping and not traveling outdoors. It will be noted that each record in subscriber notification preferences table 190 relates to a particular notification type and a particular subscriber. Thus there may be multiple preference records in table 190 for a given subscriber, one record for each type of notification for which the subscriber has indicated preferences.

Subscriber alternate contact table 192 is used to provide additional contact information for subscribers. Each record in table 192 includes a field 350 for identifying a customer identifier to link the alternate contact information to the subscriber information table for the subscriber. Each record in the subscriber alternate contact table 192 includes fields 352, 354 and 356 for identifying a telephone number or ANI, an email address and TCP/IP address. Through the use of alternate contact records in alternate contact table 192, multiple contact points may be entered into the database for a given subscriber so that a subscriber may be contacted at, for example, multiple phone numbers at a given location or at a phone number and at a cellular telephone number, or at multiple email addresses.

Subscriber history table 194 is used to store historic information on alerts delivered to a subscriber for the purposes of auditing alerts, and potentially for billing subscribers on an alert basis. Each record in subscriber history table 194 includes a customer number (customer identifier) field 360 for linking the record to other subscriber information in the database. Each record also includes additional fields for providing historical information on a type of notification which was delivered or attempted to be delivered to the subscriber. This information includes a date and time stored in fields 362 and 364 and a type of notification stored in field 366. A notification identifier which uniquely identifies the notification stored in field 266 is stored in field 368. Field 370 provides a communications address used to attempt to notify the subscriber of the condition, and field 372 indicates whether the alert was successfully completed. It will be appreciated that a given subscriber may receive multiple alerts from the system over the passage time and therefore a subscriber will have multiple records that will appear in subscriber history table 194, one for each alert or attempted alert to the subscriber that has been historically provided. It will also be appreciated that a subscriber history table record will be generated each time an alert is attempted to a subscriber and that record will be updated to indicate whether the attempt was successfully completed and the type identifier and communications addresses used in attempting the alert notification.

Figure 4A:
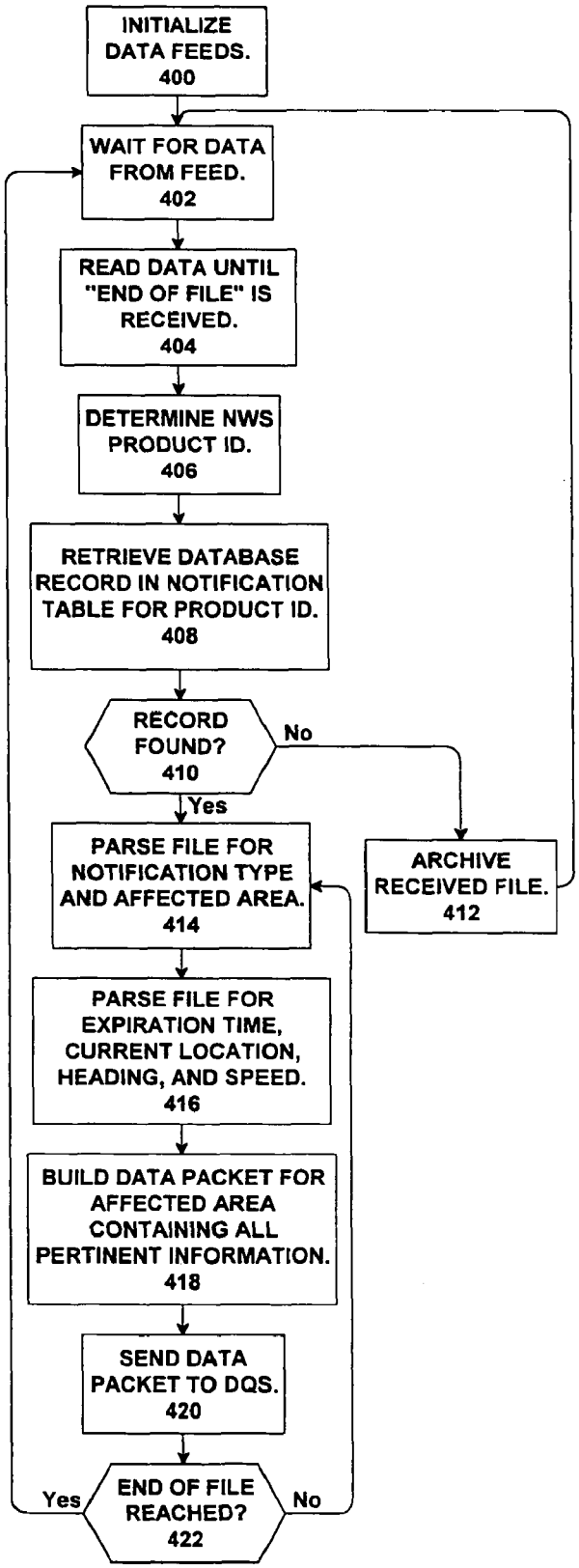
FIG. 4A is a flow chart of the operations of the Notification Parsing System in accordance with principles of the present invention.

Referring now to FIG. 4A, the process for parsing EMWIN data feeds at the notification parsing system 106 can be explained in further detail. In a first step 400, the data feeds from FM receiver 110 and/or satellite receiver 108 are initialized. Then in step 402, notification parsing system 106 waits for data from the initialized data feed. When data is received, in step 404 the data is read until an END OF FILE code is reached. (An END OF FILE code can be seen in FIG. 2 at the end of the textual information.) In a subsequent step 406, the National Weather Service product ID for the feed is determined. This product ID can be seen at 120 in FIG. 2. In subsequent step 408 a database record is retrieved from the notification table 170 of FIG. 3A that has a product ID in field 174 matching the product ID of the received data. In step 410 it is determined whether a record exists in the notification table. If not, then in step 412 the received file is archived and the notification parsing system 106 returns to step 402 to wait for additional data.

If a record is found in step 410, then in step 414 the received data file is parsed for the notification type and affected area. This will involve pattern matching and text parsing as discussed above with reference to FIG. 2. Subsequently, in step 416 the file is parsed for an expiration time, current location, heading and speed, if such information is available in the text file. After this information has been collected, in step 418 a data packet (having the format illustrated in Table I) is generated. All pertinent information that has been obtained from the data stream is included in the data packet. In step 420 the data packet is sent to the database query system 112. Thereafter, in step 422, it is determined whether the END OF FILE code has yet been reached. In some cases, multiple products may be compiled in the same text file. When this occurs, processing will return to step 414 to continue to parse the file for additional notifications. When the END OF FILE is reached in step 422, processing returns to step 402 to wait for additional data.

Figure 4B:
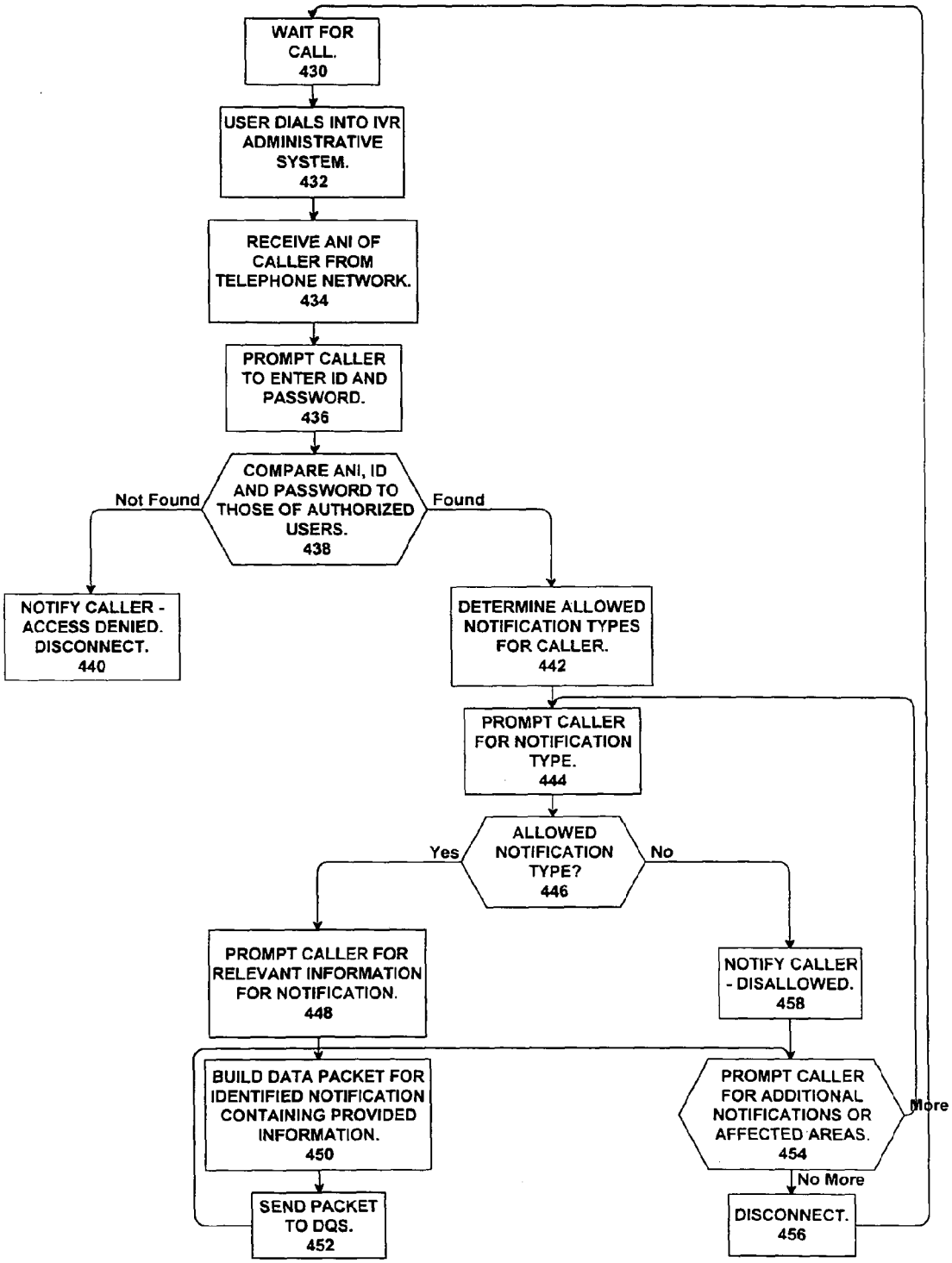
FIG. 4B is a flow chart of the operations of the IVR Administrative System in accordance with principles of the present invention.

Referring now to FIG. 4B, the processing performed by the IVR administrative system can be explained in further detail. In a first step 430, IVR administrative system 116 waits for a call from a user. In step 432 a user dials into the IVR administrative system; in response step 434 the IVR administrative system receives the ANI or caller ID for the caller from the telephone network. In step 436 the caller is prompted to enter a login identifier and a password using touch tone keys on their touch tone telephone. In step 438 the ANI, login identifier and password collected in the proceeding steps are compared to those of authorized users of the system. If the ANI, login ID and password combination is not found, then in step 440 the caller is notified that access is denied, and the connection is terminated. If the caller is authorized, then in step 442 the caller's login ID is used to determine notification types that the caller is allowed to initiate. In step 444, the caller is then prompted for a notification type. The caller will then provide, using DTMF (touch tone) telephone keys, a notification type number. In step 446 it is determined whether the entered notification type is one that is allowed for the caller. If so, then in step 448 the caller is prompted for relevant information needed to prepare an alert notification. This information may include a location code, a latitude and longitude, heading and speed information or other information that is relevant to the type of alert that is to be generated. In step 450 this information is built into a data packet conforming to the format of Table I. Then in step 452, the packet is sent to the database query system 112 for use in generating alerts to the affected subscribers. Thereafter, in step 454 the caller is prompted for any additional notifications of affected areas, so that the caller may in rapid succession enter a number of alerts or identify a number of affected areas. If the caller, again using DTMF (touch tone) keys, indicates that there are additional notifications or affected areas, processing returns to step 444 to prompt the caller for those additional notifications. If the caller indicates that there are no more notifications or affected areas, or terminates the connection, then in step 456 the IVR administrative system 116 disconnects and then returns to step 430 to wait for another call.

Returning to step 446, if the notification type entered by the caller is disallowed, processing continues from step 446 to step 458 in which the caller is notified that the caller has entered a disallowed notification type. Processing then continues to step 454 to permit the caller to enter a new notification if another is desired.

Figure 4C:
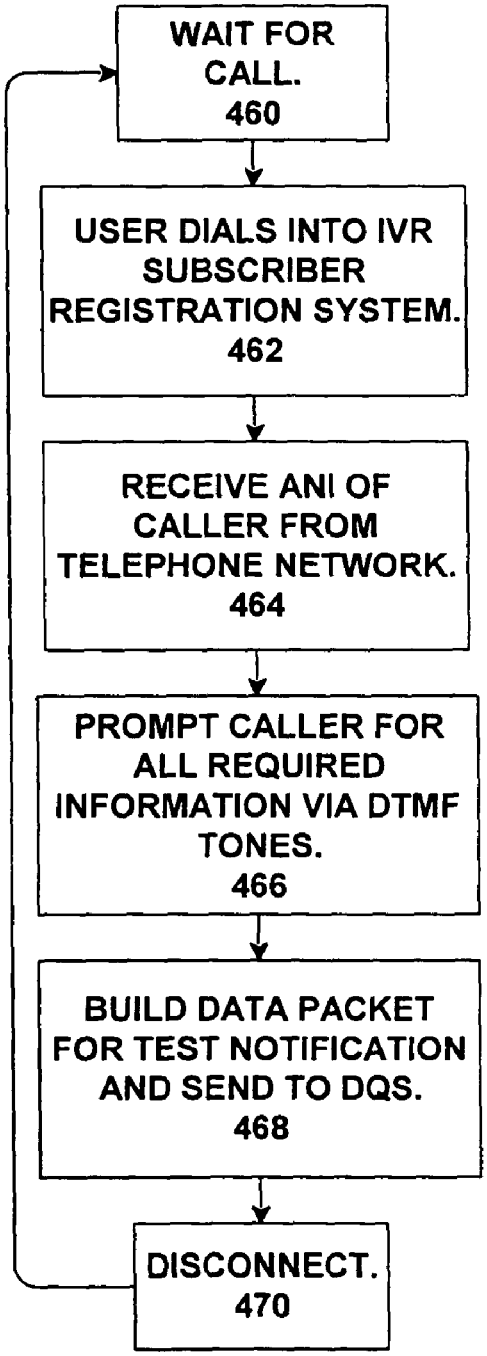
FIG. 4C is a flow chart of the operations of the IVR Subscriber Registration System in accordance with principles of the present invention.

Referring now to FIG. 4C, the process performed by IVR subscriber registration system to enroll new subscribers can be described in greater detail. In a first step 460, the IVR subscriber registration system waits for a call from a new subscriber. When a subscriber dials into the IVR subscriber registration system in step 462, the IVR subscriber registration system responds in step 464 by receiving the ANI (caller ID) for the caller from the telephone network. Subsequently, the IVR subscriber registration system in step 466 prompts the caller for all the required information for subscriber information, and the caller delivers this information via DTMF or touch tone data entry. Thereafter, in step 468 a data packet conforming to Table I is built and submitted to database query system 112. This data packet will cause database query system 112 to issue a test notification to the new subscriber. Thereafter, the IVR subscriber registration system disconnects in step 470 from and returns to step 460 to wait for a new call from another new subscriber.

Figure 4D:
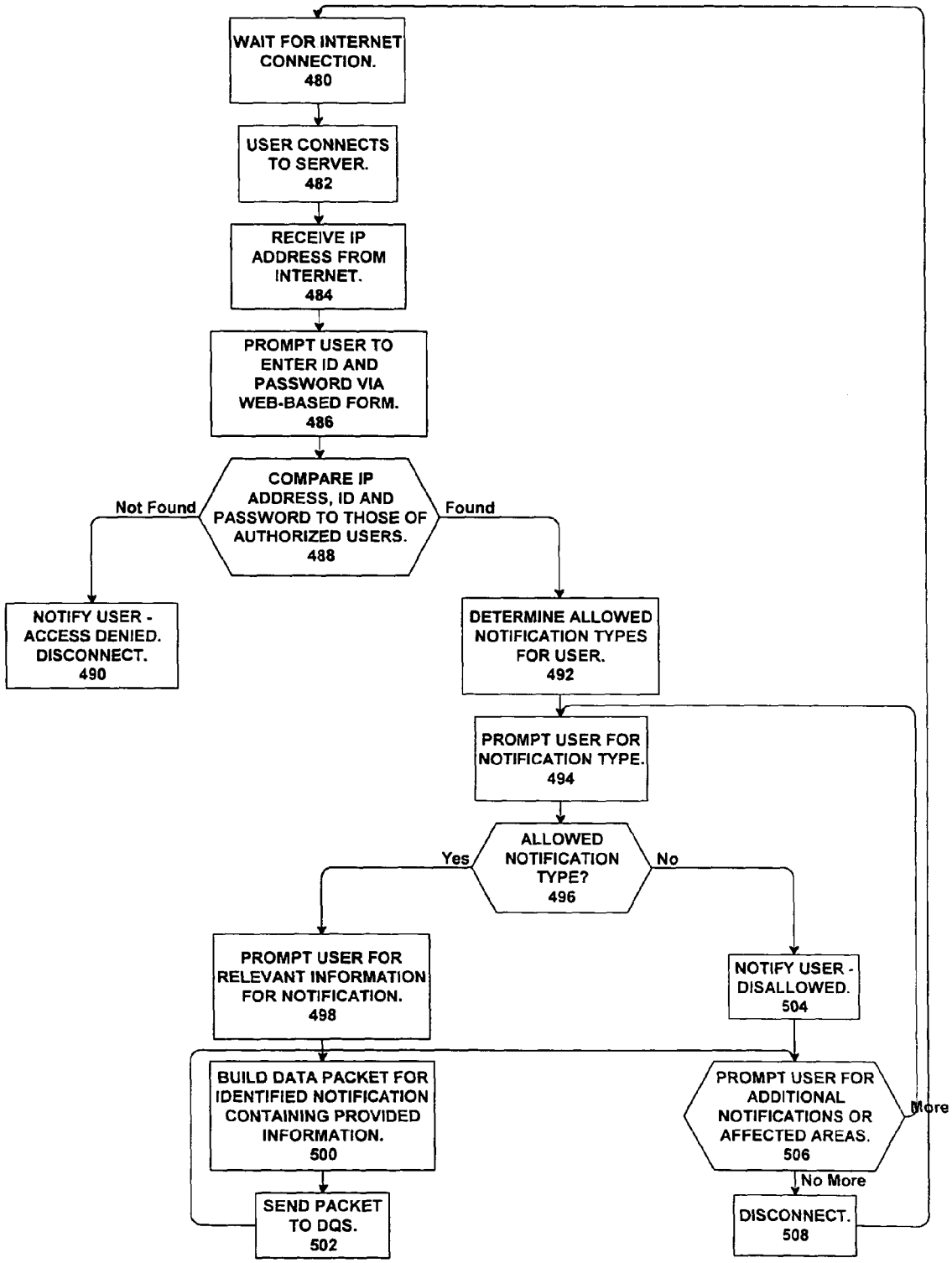
FIG. 4D is a flow chart of the operations of the Web Server Administrative System in accordance with principles of the present invention.

Referring now to FIG. 4D, the process performed by web server 114 in receiving alert notifications can be more fully explained. In the first step 480, web server 114 waits for an Internet connection. In step 482 a user connects to a web server 114, typically using a hypertext transfer protocol (HTTP) application. In step 484, web server 114 receives an Internet protocol (IP) address for the user from the Internet connection. In step 486, the user is prompted to enter a login identifier and password via a hypertext markup language (HTML) form, otherwise known as a world wide web-based form. After the user has entered the requested information in step 488, the IP address, login ID and password provided by the user are compared to those of authorized users. If this information does not match any authorized user, then in step 490 the user is notified (via a subsequent HTML page) that access is denied, and the connection to the user's computer is disconnected. If the connection is allowed, then in step 492 web server 114 determines the notification text that the user is permitted to create. In step 494 the user is prompted again, using the web based form, for a notification type. The provided notification type is then evaluated in step 496 to determine if it is a type allowed by the server for the user. If so, then in step 498, additional web based forms are used to prompt the user for relevant information for the notification, such as geographic information, heading and speed information or other information discussed above. In step 500, a data packet is generated (using the format of Table I) reflecting the indicated notification type and all provided information. In step 502 this packet is sent to the database query system 112.

Returning to step 496, if the identification type identified by the user in step 494 is not permitted to the user, then the user is notified in step 504 that this notification type is disallowed. After step 504 or step 502, the user is prompted via web based HTML form, to indicate whether additional notifications or affected areas are to be entered. If there are additional areas or notifications, the user may indicate as such by clicking an appropriate area in the displayed form, in which case the user is returned to step 494 and prompted for another notification type. If the user indicates that no additional notifications or affected areas are needed, then in step 508 the connection to the user's computer is terminated.

Figure 4E:
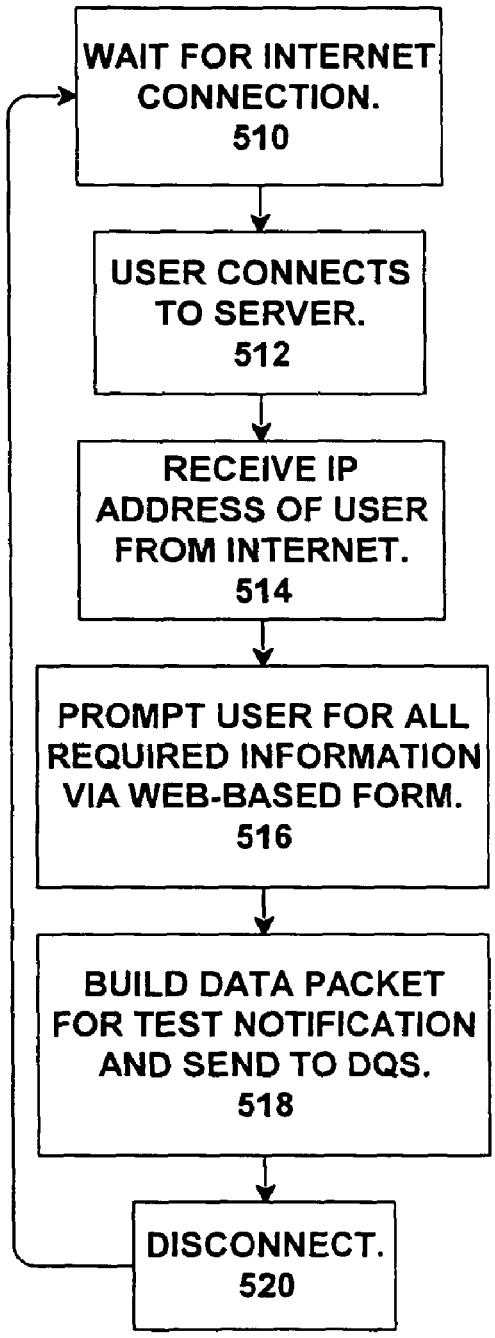
FIG. 4E is a flow chart of the operations of the Web Subscriber Registration System in accordance with principles of the present invention.

Referring to FIG. 4E, the process for subscriber enrollment in the system via web server 114 can be understood in greater detail. In a first step 510, web server 114 waits for an Internet connection to be made by a new subscriber. When a connection is made (step 512), the IP address of the user is received from the Internet (step 514) and (step 516) the user is prompted to enter required information for subscription to the system utilizing a web based form. The information requested includes (as described with reference to FIG. 3C), home address information, billing information and other safety or alert preference information. After this information has been received and stored by web server 114, a data packet (formatted in accordance with Table I) is created in step 518 and sent to the database query system 112. This data packet causes database query system 112 to initiate a test notification to the newly enrolled subscriber. After this data packet has been set in step 518, in step 520 the Internet connection to the user is disconnected and processing returns to step 510 to wait for another subscriber to connect to web server 114.

Figure 4F:
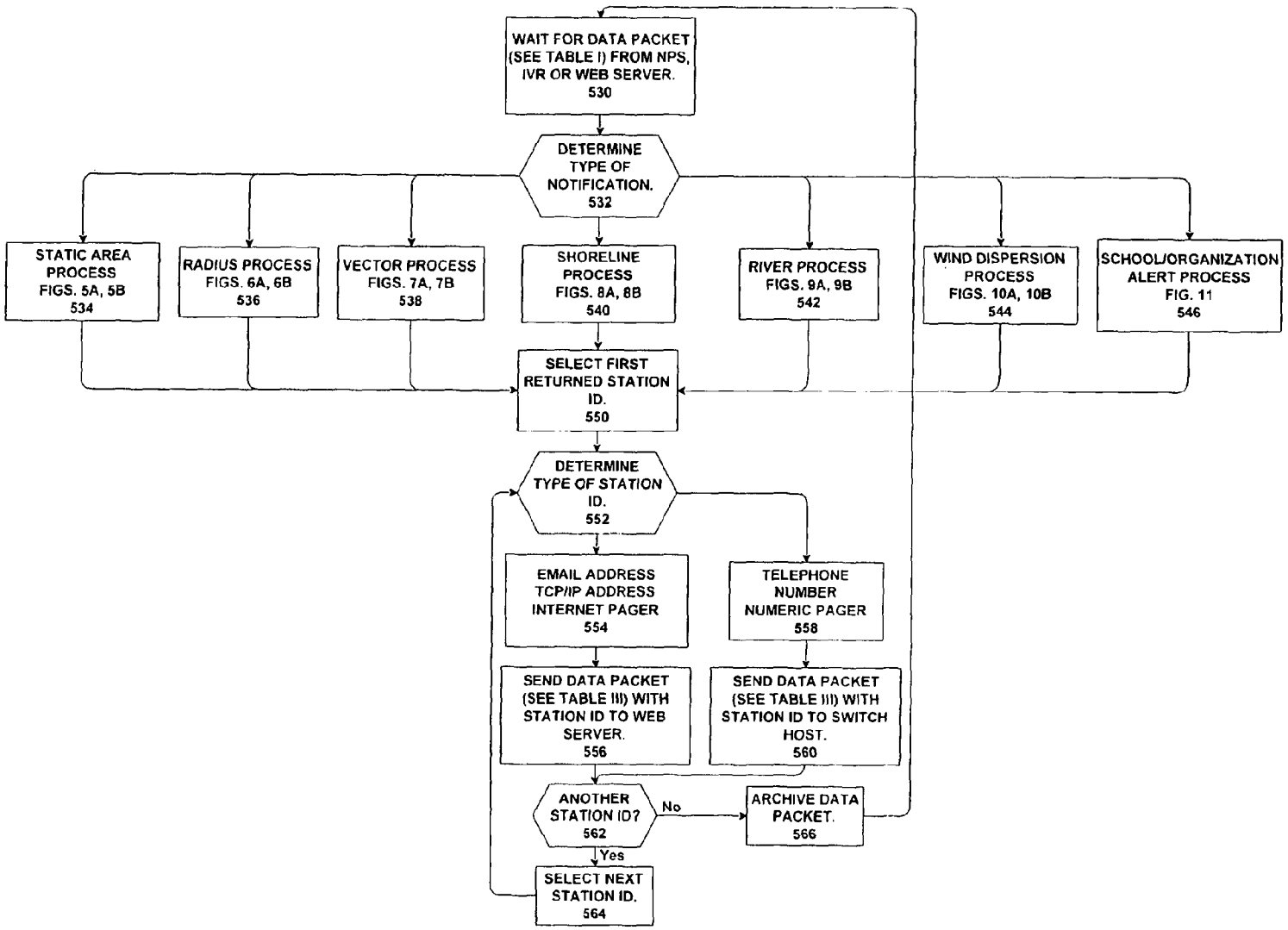
FIG. 4F is a flow chart of the operations of the Database Query System in accordance with principles of the present invention.

Referring now to FIG. 4F, greater detail can be provided on the process performed by database query system 112 in response to data packets from notification parsing system 106, web server 114 and IVR system 116. In a first step 530, database query system 112 waits for a data packet formatted in accordance with Table I from the notification parsing system 106, IVR system 116 or web server 114. When a packet is received (step 532), the packet is evaluated and the type of notification it requests is evaluated. Based upon the type of notification, different actions are performed as explained below with reference to FIGS. 5 through 11. If the notification is a static area notification, then a static area process 534 is performed as is elaborated below with reference to FIGS. 5A and 5B. If the notification is a radius notification, then a radius process 536 is performed as elaborated below with reference to FIGS. 6A and 6B. If the notification is a vector notification, then a vector process 538 is performed as elaborated below with reference to FIGS. 7A and 7B. If the notification is a shoreline notification, then a shoreline process 540 is performed as described below with reference to FIGS. 8A and 8B. If the notification is a river notification, then a river process 542 is performed as described below with reference to FIGS. 9A and 9B. If the notification type is a wind dispersion notification, then a wind dispersion process 544 is performed as described below with reference to FIGS. 10A and 10B. If a school or organization-related alert notification is requested, then a school or organization alert process 546 is performed as described below with reference to FIG. 11.

The processes 534 through 546 result in generation of station identifiers to which alert notifications are to be directed. After these processes are complete (step 550), a first of the selected station identifiers is selected, and in step 552 the type of the station identifier is evaluated. If in step 554 the station identifier is an email address, TCP/IP address, or Internet accessible pager, then in step 556 a data packet conforming to Table III above, and including the station identifier, is sent to web server 114 for ultimate delivery to the appropriate address. If in step 558 the station identifier is a telephone number or a numeric pager number, then in step 556 a data packet conforming to Table III above is sent to switch host 130 for subsequent delivery to the telephone or numeric pager number. Thereafter, in step 562 it is determined whether there is another station identifier that was previously identified in one of the processes 534 through 546. If so, then in step 564 the next station identifier is selected and processing returns to step 552 to determine the type of the next station identifier. If in step 562, there is no additional station identifiers, then in step 566 the received data packet which began the process is archived and processing returns to step 530 to wait for another data packet.

Figure 4G:
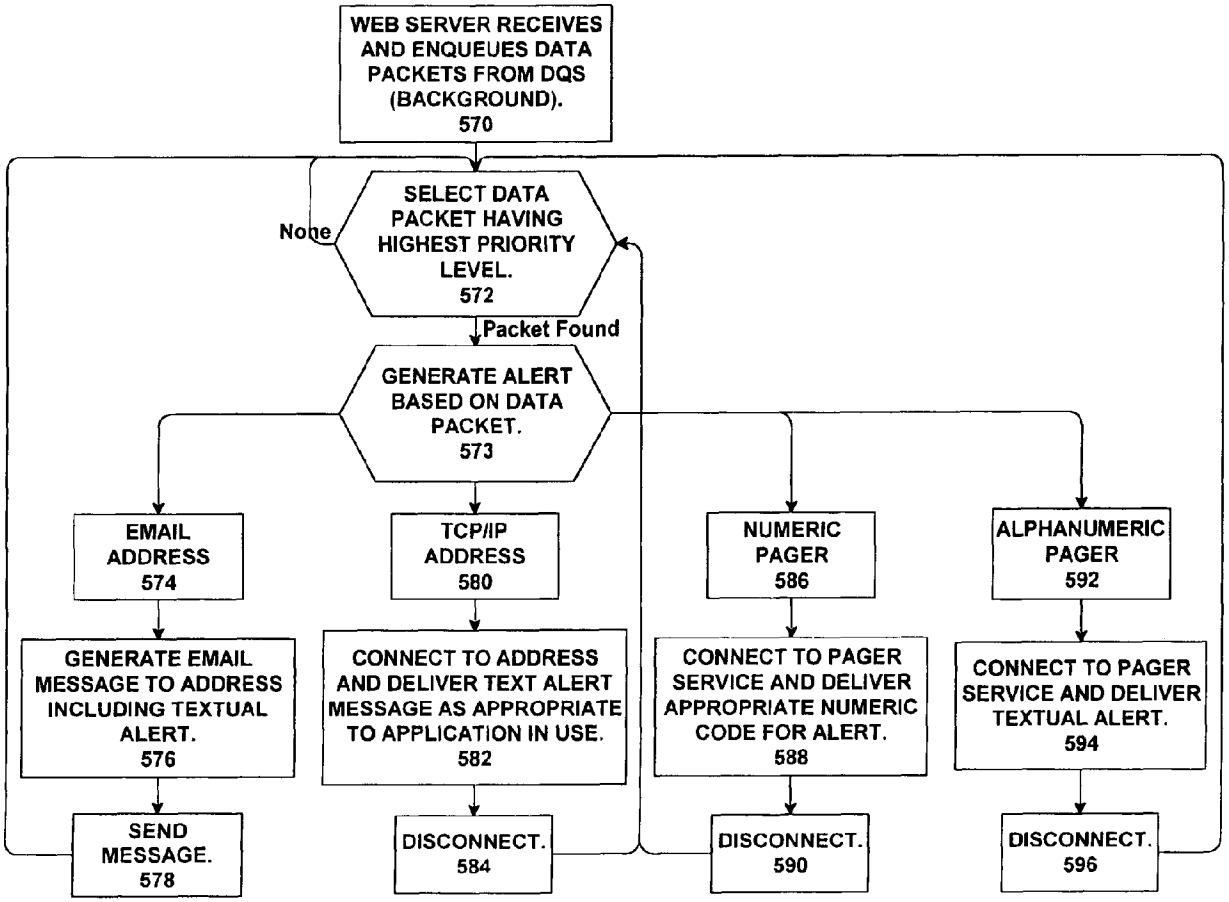
FIG. 4G is a flow chart of the operations of the Web Server in accordance with principles of the present invention.

Referring now to FIG. 4G, the process performed by web server 114 in processing data packets received from the database query system 112 can be further explained. In a first step 570, web server 114 receives data packets from the database query system 112. Step 570 may be performed in background to other steps in FIG. 4G so that receipt data packets may continue while data packets are being processed.

When one or more data packets have been received for processing, in step 572, the received data packets are evaluated to select the data packet having the highest priority level. This highest priority data packet is then used to generate an alert. The type of alert generated is based upon the station identifier provided in the data packet. If the data packet provides an email address (step 574), then in step 576, an email message is generated directed to that email address including a textual message describing the alert condition. The message is then sent (step 578) and processing returns to step 572. If the station identifier is a TCP/IP address (step 580), then in step 582 web server 114 connects to this TCP/IP address and delivers a textual alert message in a manner that is appropriate to the Internet application in use. Then, in step 584, the connection is disconnected and processing returns to step 572. If the data packet selected includes an Internet address for a numeric pager service (step 586), then in step 588 a connection is established to the pager service and the appropriate numeric code is delivered for the alert type identified by the data packet. In step 590 the connection to the page service is disconnected and processing returns to step 572. If a data packet identifies address for an alpha numeric pager server (step 592), then in step 594 a connection is established to the pager service and a textual alert is delivered to the pager service. Then in step 596, the connection to the pager service is disconnected and the processing returns to step 572.

Figure 4H:
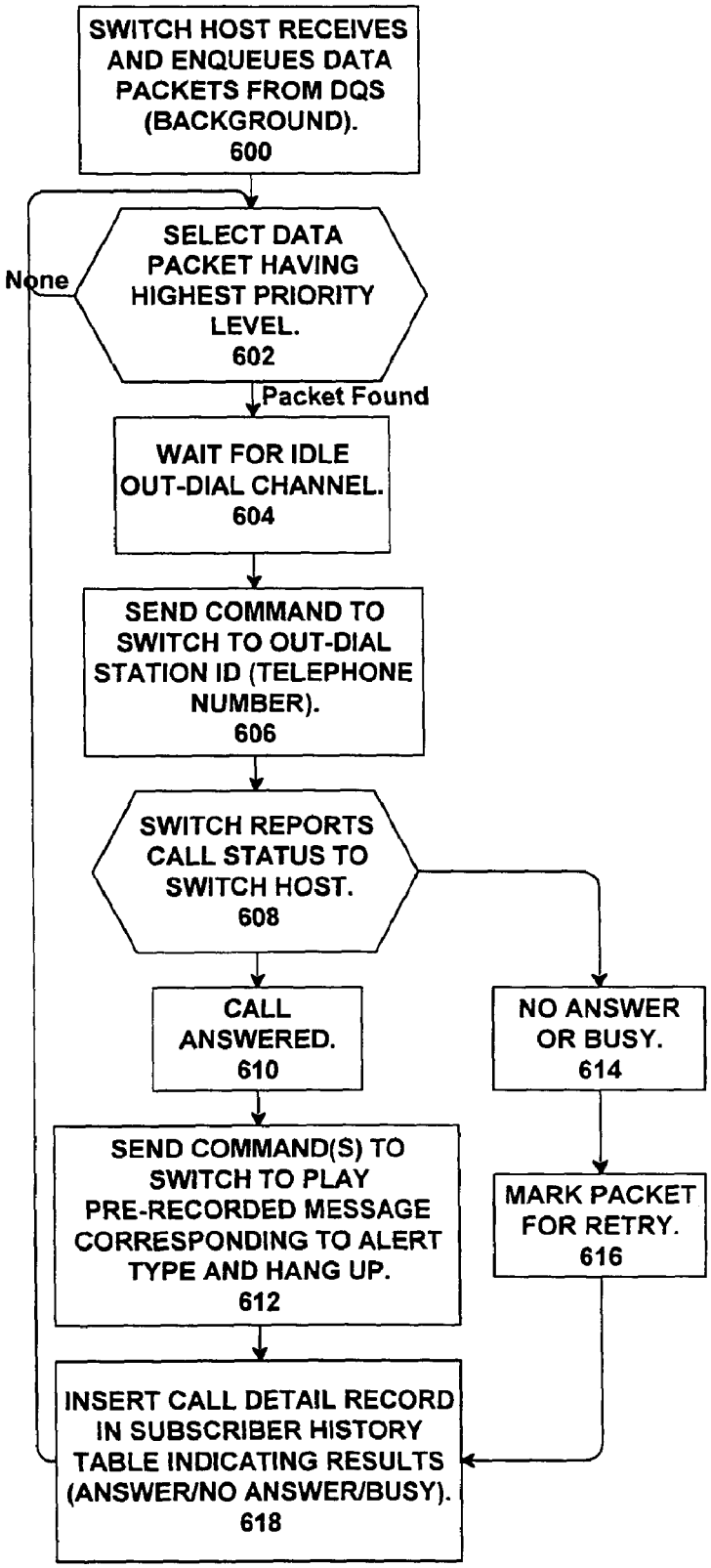
FIG. 4H is a flow chart of the operations of the Switch Host in accordance with principles of the present invention.

Referring now to FIG. 4H, the process performed by the switch host 130 in response to data packets received from database query system 112 can be explained in further detail. As described above, data packets can be received from the database query system 112 in background so that the remaining steps of FIG. 4H can be performed as packets are continuously received. In a first step 602 the data packets that have been received are evaluated to select the data packet having the highest priority level. After a packet has been selected in step 604, switch host 130 waits for an idle out dial channel in switch 132. When an idle channel is available, in step 606 a command is sent to switch 132 to out dial to the station identifier identified in the selected packet. Subsequently, in step 608, the switch will report the call status to the switch host as the call is performed. If the call is answered (step 610), then in step 612 the switch host 130 delivers commands to switch 132 to play prerecorded messages corresponding to the alert type of the selected packet and then to hang up the established connection. If there is no answer or the dialed number is busy (step 614), then the packet is marked for retry (step 616). After either of step 612 or 616, in step 618 a detailed call record is inserted in the subscriber history table 194 indicating the results of the call that was placed, i.e., whether the call was answered or not answered or busy. Processing then returns to step 602 to select another data packet for delivery to a subscriber.

Figure 5A:
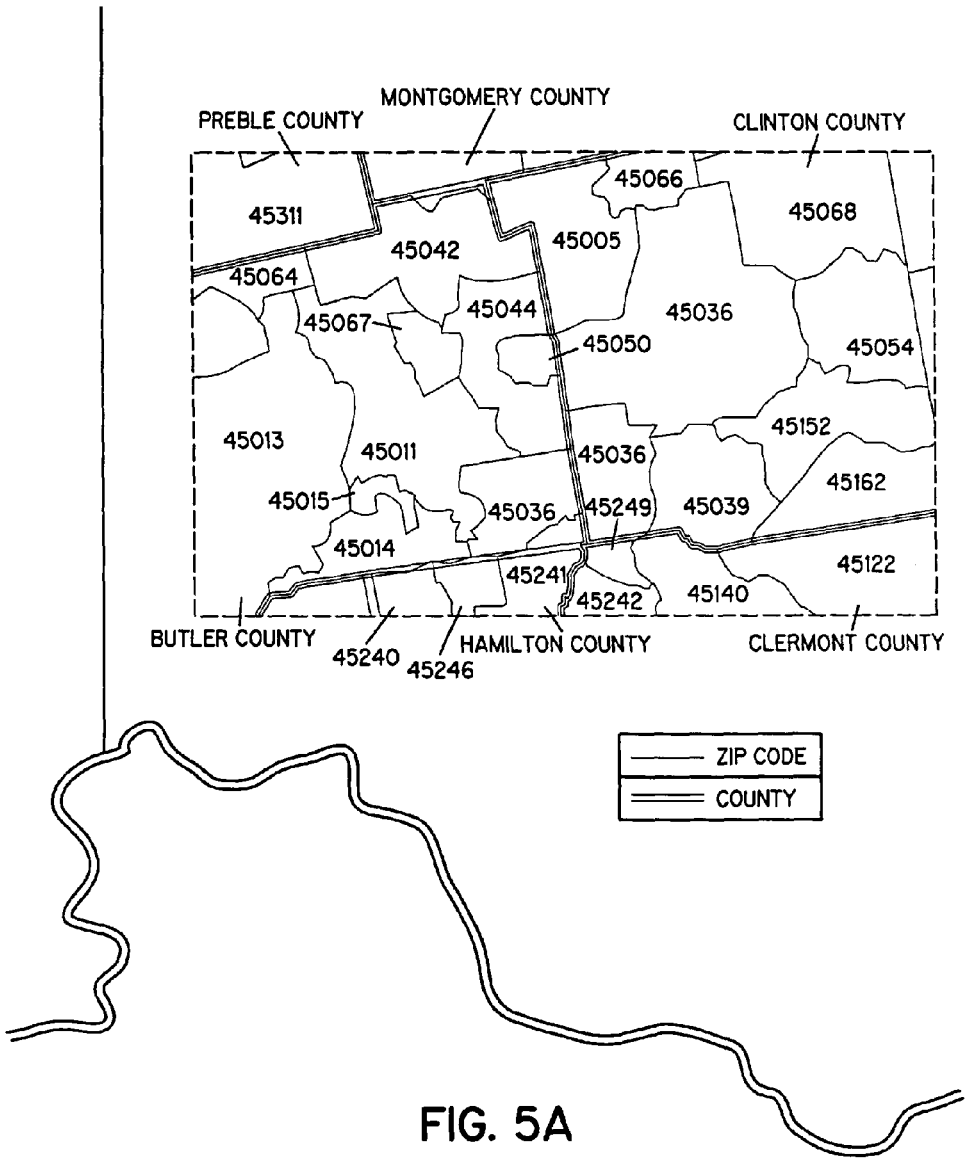
FIG. 5A is an illustration of a Static Area Notification scenario.
Figure 5B:
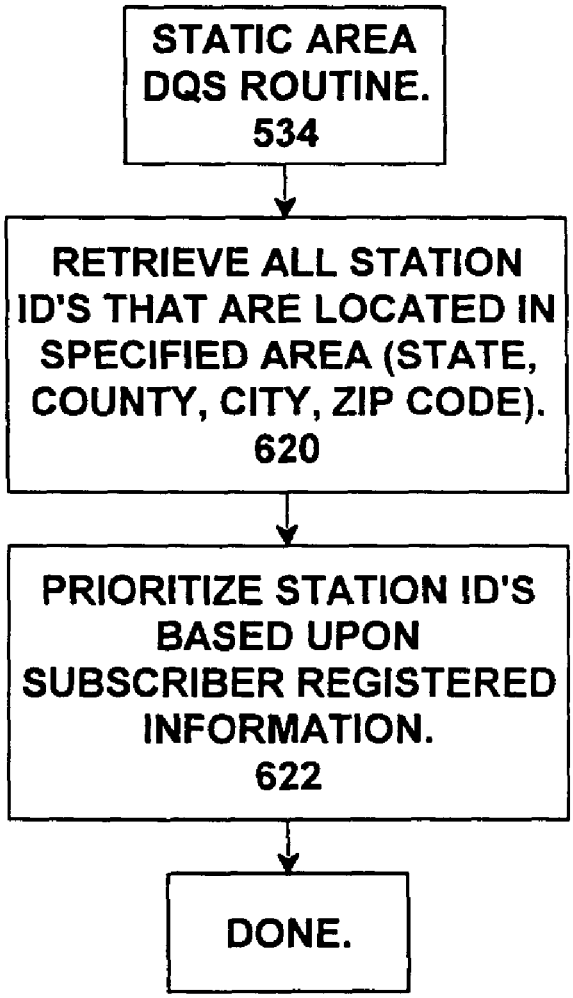
FIG. 5B is an illustration of specific operations performed by the Database Query System in handling this scenario.

Referring now to FIGS. 5A and 5B, the static area process can be described in greater detail. In the static area process, in step 620 database query system 112 retrieves all station identifiers of subscribers located in the area specified in the alert, which may be a state, county, city, zip code, or other definable region. Then in step 622 those station IDs are prioritized based upon the information registered for the subscriber. FIG. 5A illustrates exemplary counties and zip codes that may be utilized in a typical static area process.

Figure 6A:
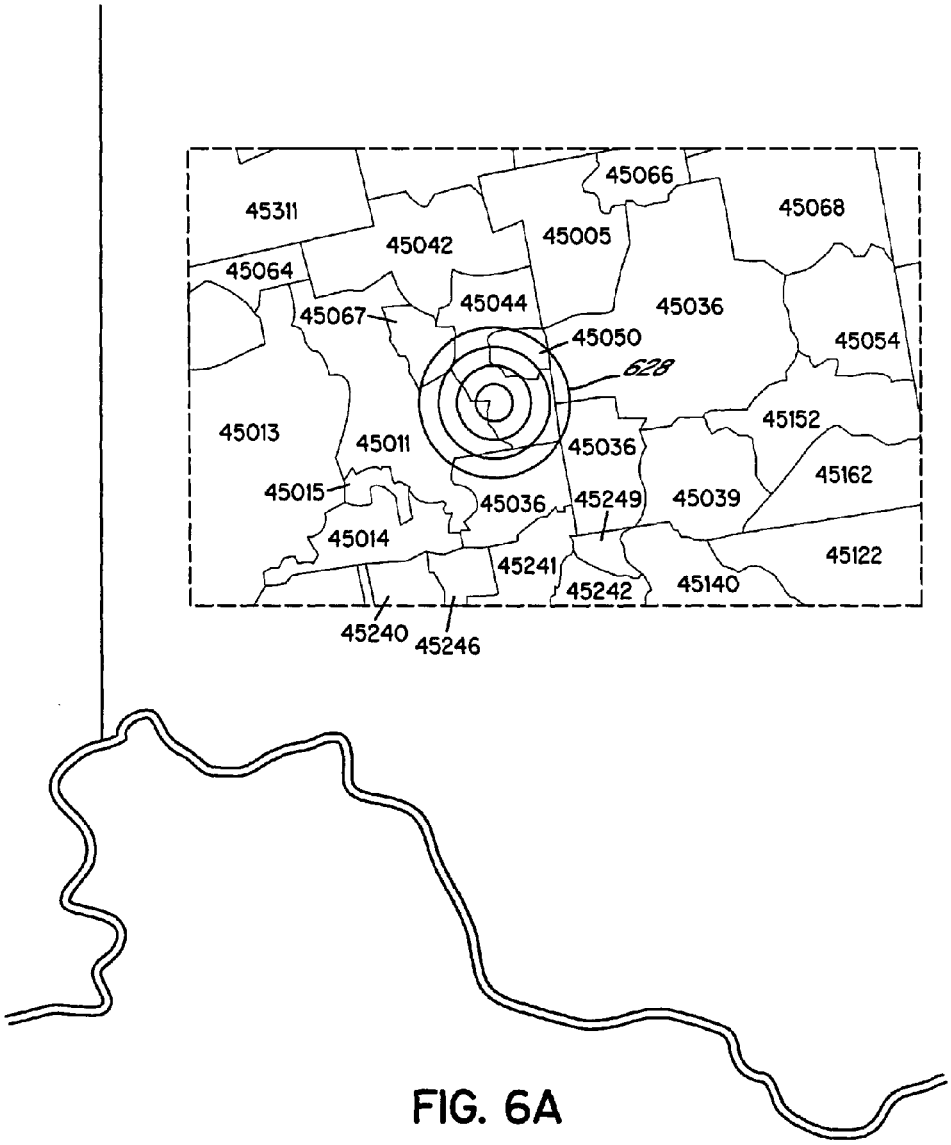
FIG. 6A is an illustration of Radius Notification scenario.
Figure 6B:
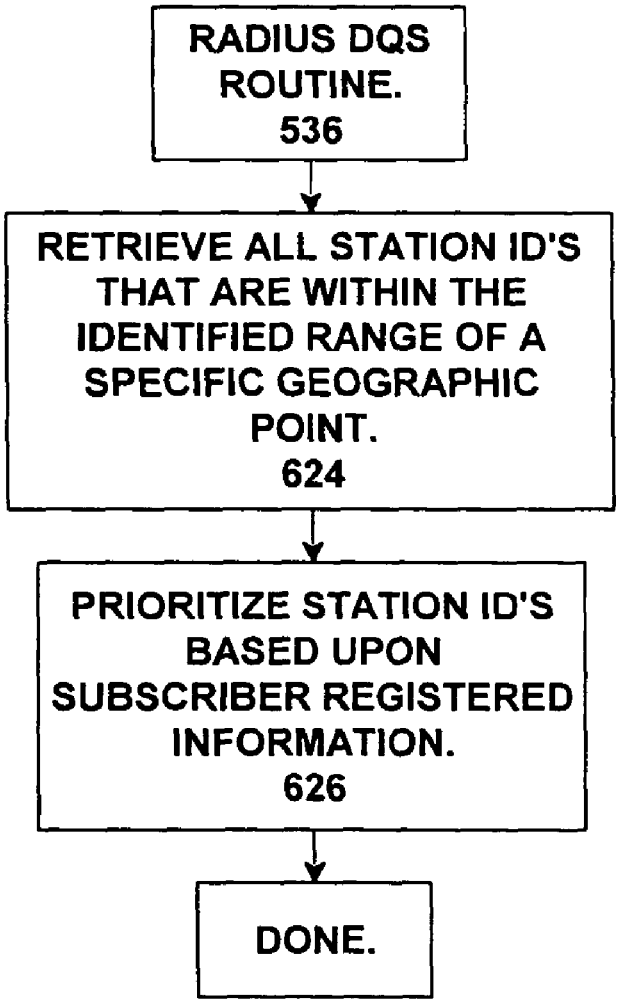
FIG. 6B is an illustration of specific operations performed by the Database Query System in handling this scenario.

Referring now to FIGS. 6A and 6B, the operation of a radius process 536 of the database query system 112 can be explained in further detail. In a radius process, in step 624 all station identifiers for subscribers within an identified range of a specific geographic point are retrieved. Then in step 626, the retrieved station identifiers are prioritized based upon information registered by the subscribers. As seen in FIG. 6A, a radius routine will notify subscribers within one of a number of predefined circular regions and mileages 628 surrounding a specific geographic position, which may be identified by GPS coordinates, latitude and longitude, or even a zip code or postal address. In the case of a zip code, which have regions such as are shown in FIG. 6A, the geographic center of the zip code region will be used as the geographic position from which to compute the circular region 628.

Figure 7A:
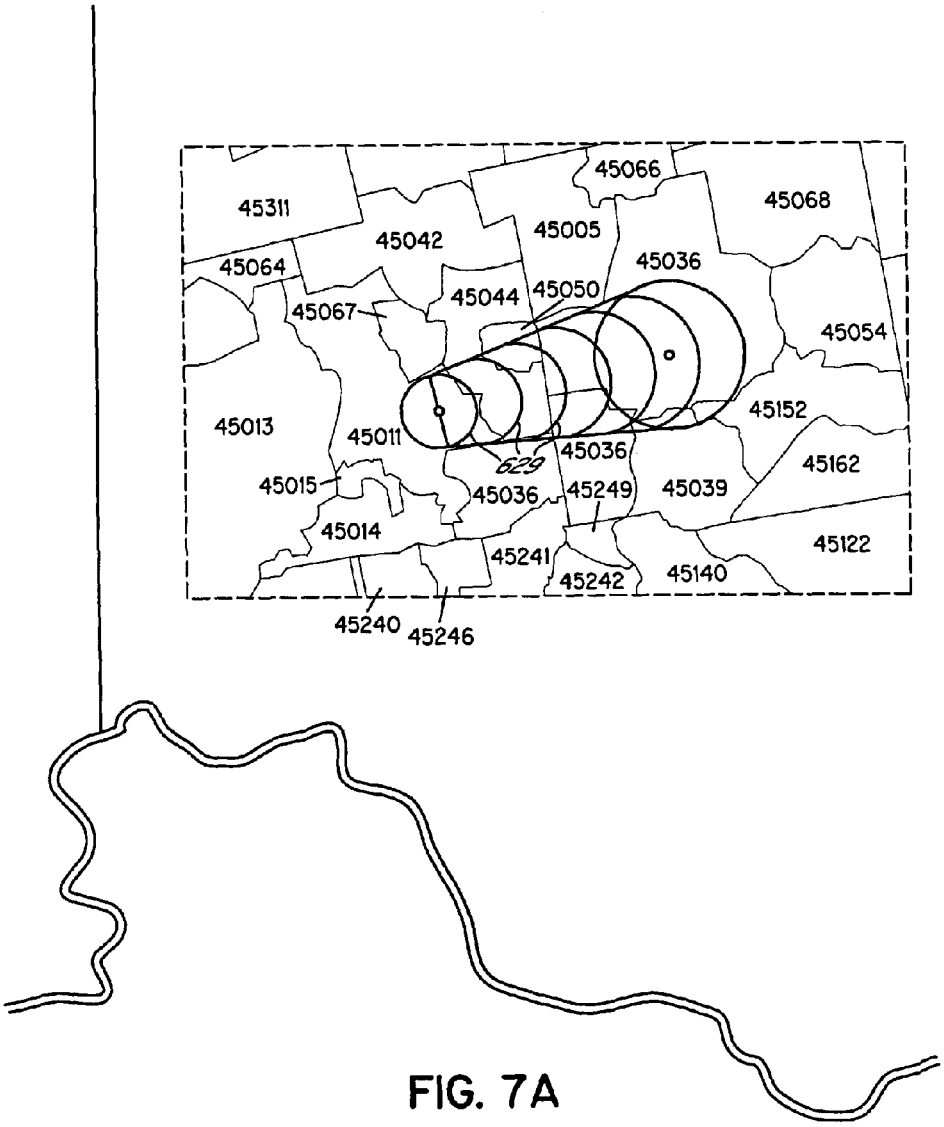
FIG. 7A is an illustration of Vector Notification scenario.
Figure 7B:
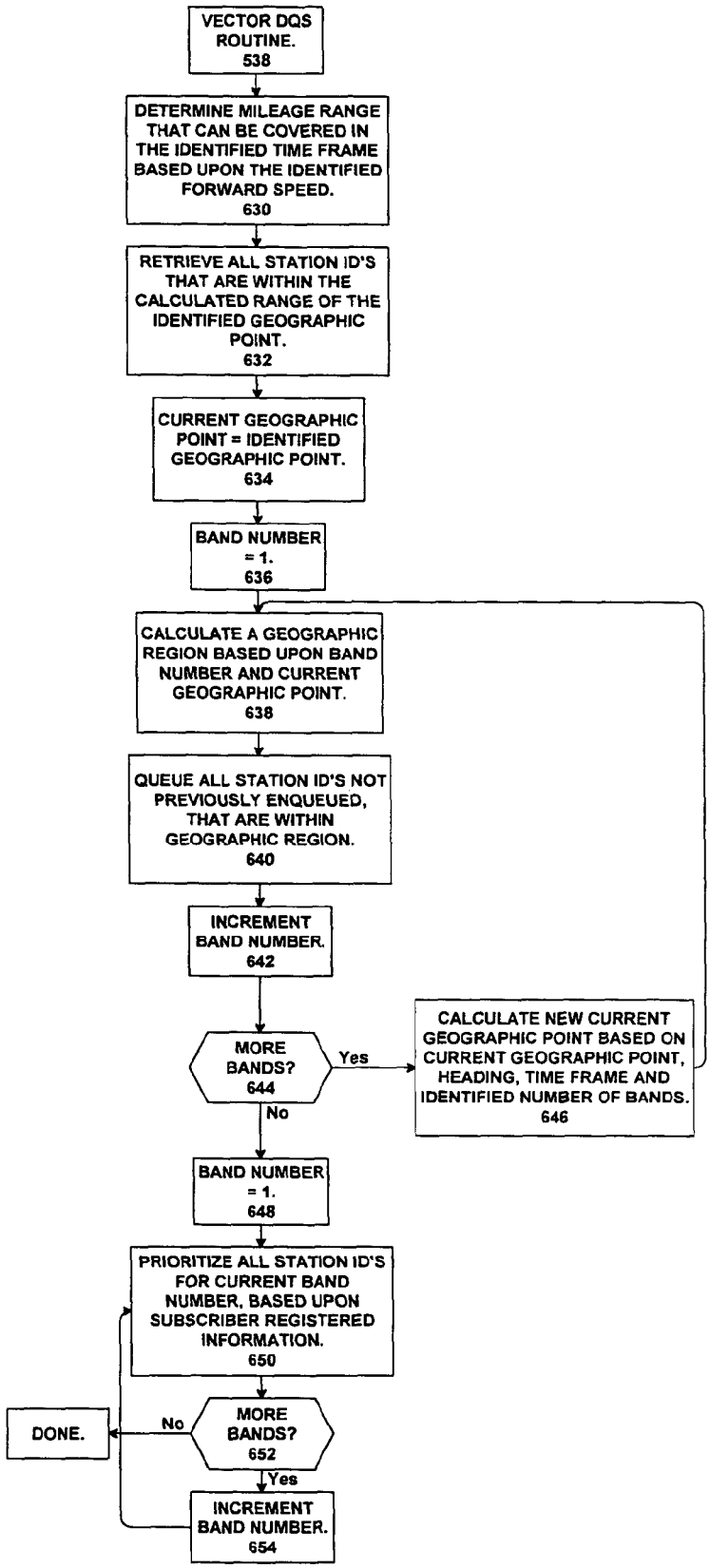
FIG. 7B is an illustration of specific operations performed by the Database Query System in handling this scenario.

Referring now to FIGS. 7A and 7B, the operations of a vector process 539 performed by database query system 112 can be further explained. As seen in FIG. 7A, in this process the number of geographic locations is computed, and from these locations subscribers located within a radius of those locations are identified for notification of the alert condition. Each radial region 629 identified during this process is known as a "band" of geographic locations. The vector process is performed for a defined number of bands and a defined time frame.

A first step 630 in the vector process is to determine a mileage range that can be covered by the hazard (e.g., tornado) in the identified time frame based upon the identified forward speed. Then in step 632, all station identifiers for subscribers that are within the calculated range of the identified geographic point are retrieved. In step 634 and step 636, variables are initialized for later use in collecting additional station identifiers. Specifically in step 634, a current geographic point is set to be the identified geographic point in the alert notification packet. In step 636, the band number is initialized to a value of one.

In a subsequent loop of steps 638, 640, 642, 644 and 646, geographic regions are calculated, and then station IDs for subscribers within those geographic regions are identified. In a first step 638, the geographic region is calculated based upon the current band number and current geographic point. This involves steps similar to those described above with reference to steps 630 and 632 in which a mileage range is computed and then station IDs for subscribers within that mileage range of the current geographic point are identified. After 638, in step 640 all station identifiers that are not previously enqueued, that are within the geographic region identified in step 638 are enqueued. In step 642, the current band number is incremented. And in step 644, it is determined whether there are additional bands to be included in the vector routine. If so, then in step 646 a new current geographic point is computed based upon the existing geographic point and the heading, time frame and identified number of bands provided in the alert notification. This causes the center of subsequent regions to move along the heading identified by the alert notification. After step 646, processing returns to step 638 to calculate a new geographic region and queue additional station identifiers.

After all bands have been completed, the processing proceeds from step 644 to step 648 in which the band number again is initialized to a value of one. Next, in step 650 station IDs identified in the current band number are prioritized based upon subscriber registered information. Thereafter, in step 652 it is determined whether there are more bands, and if so then in step 654 the band number is incremented. After all bands have been processed then the vector process is completed. These final steps 650, 652 and 654 cause station identifiers to be prioritized such that those in the first band, which are nearest to the hazard or threat, are prioritized before those in subsequent bands.

Figure 8A:
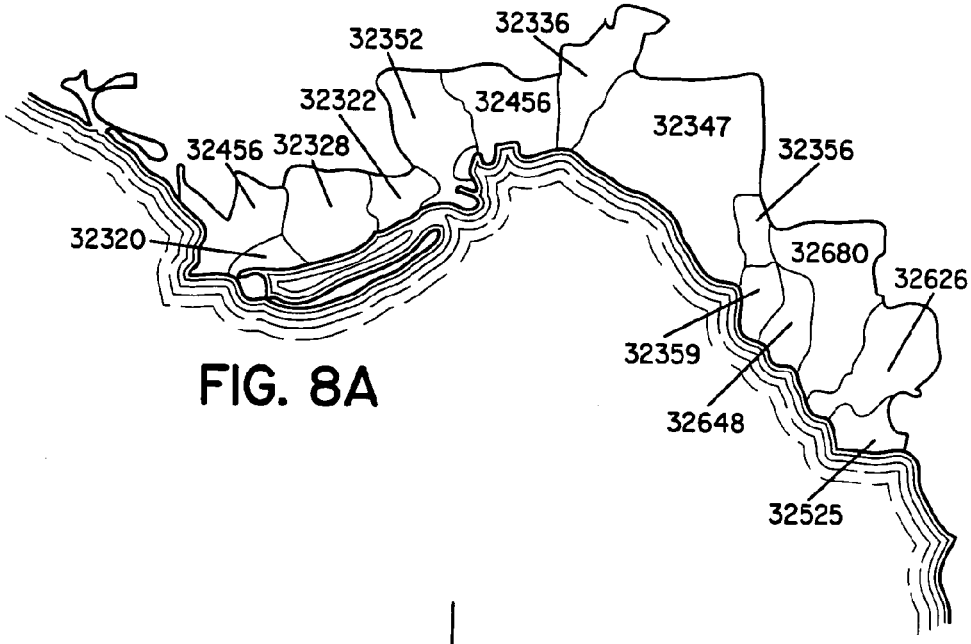
FIG. 8A is an illustration of a Shoreline Notification scenario.
Figure 8B:
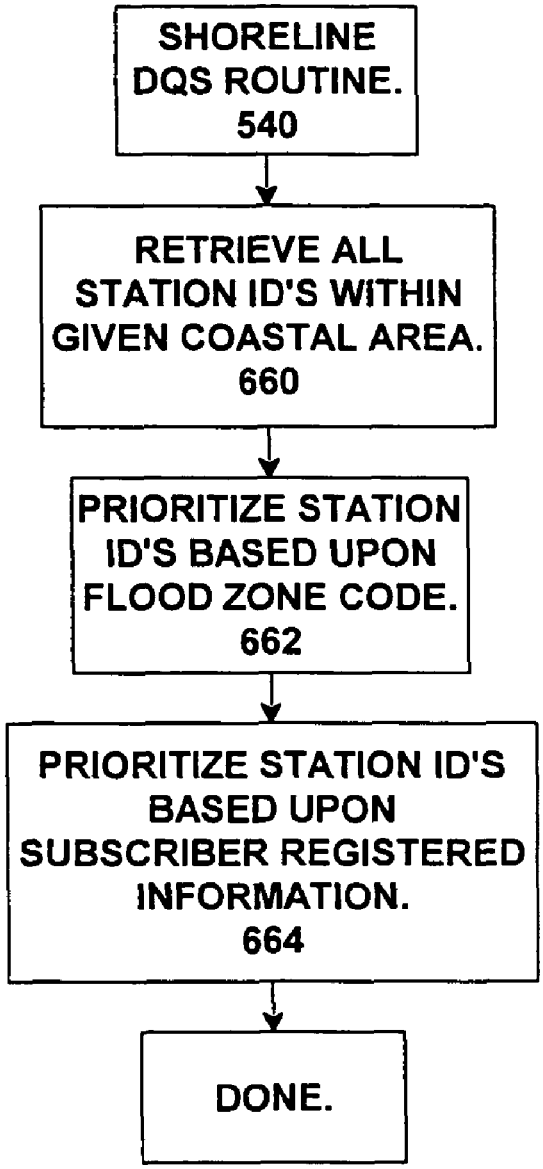
FIG. 8B is an illustration of specific operations performed by the Database Query System in handling this scenario.

Referring now to FIGS. 8A and 8B, the shoreline process 540 of the database query system 112 can be explored. In a first step 660, all station identifiers within a given coastal area are retrieved. Then in step 662, those station identifiers are prioritized based upon flood zone coding of the corresponding subscriber records. Then in step 664, station identifiers are further prioritized based upon subscriber registered information. As seen in FIG. 8A, this process permits alert notifications to be delivered to multiple subscribers who are threatened by a coastal hazard such as a tidal wave, high seas or hurricane.

Figure 9A:
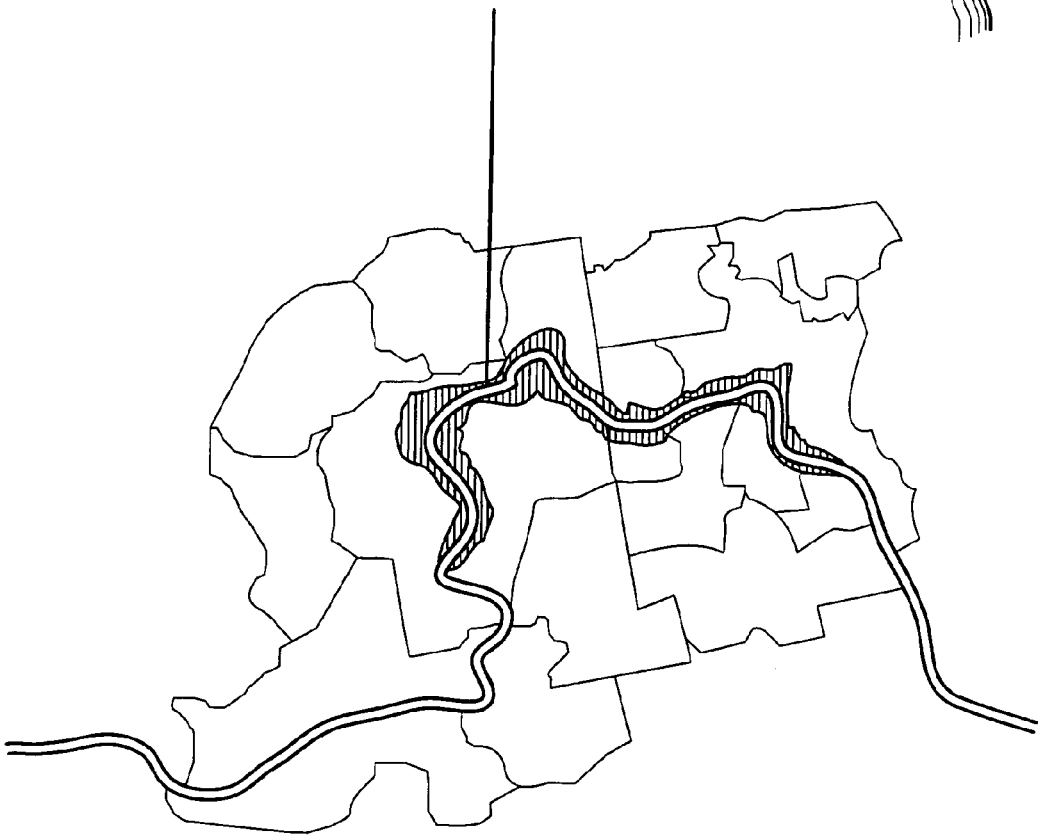
FIG. 9A is an illustration of a River or Flood Plane Notification scenario and FIG. 9B is an illustration of specific operations performed by the Database Query System in handling this scenario.
Figure 9B:
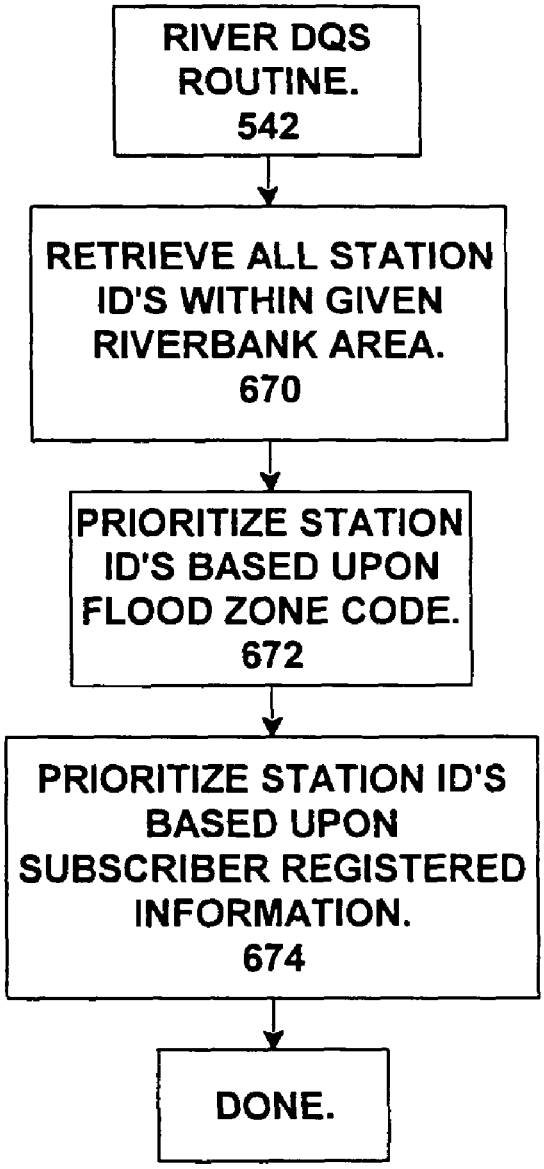

Referring now to FIGS. 9A and 9B, the river routine 542 of the database query system 112 can be elaborated. In the first step 670, all station identifiers within given riverbank area are retrieved. Then in step 672, those station identifiers are prioritized based upon flood zone code in the subscriber information. Subsequently, in step 674 those station identifiers are again prioritized based upon other registered information from subscribers. As seen in FIG. 9A, this process permits all subscribers within a flood plane or threatened by flooding in a river area to be advised of an emergency condition.

Figure 10A:
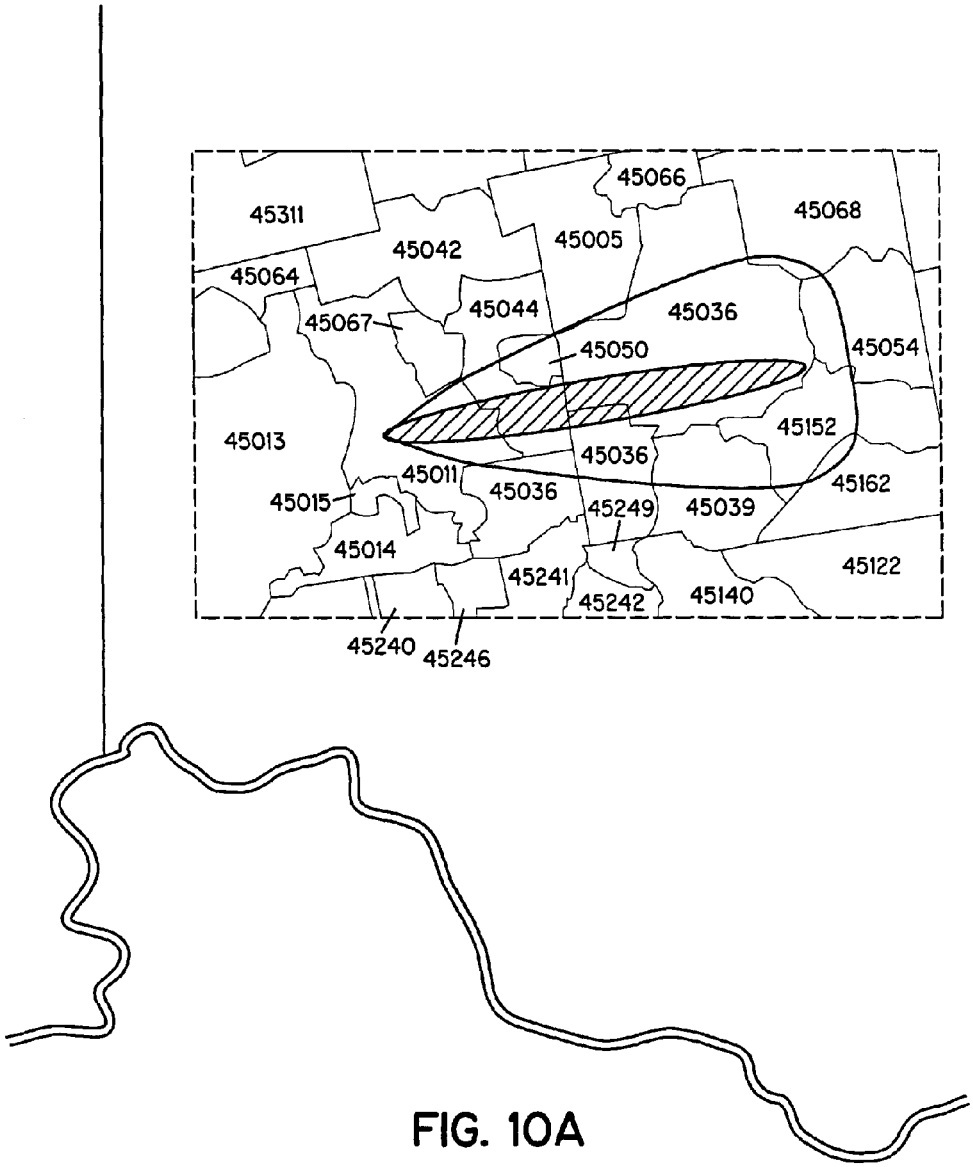
FIG. 10A is an illustration of a Wind Dispersion Notification scenario and FIG. 10B is an illustration of specific operations performed by the Database Query System in handling this scenario.
Figure 10B:
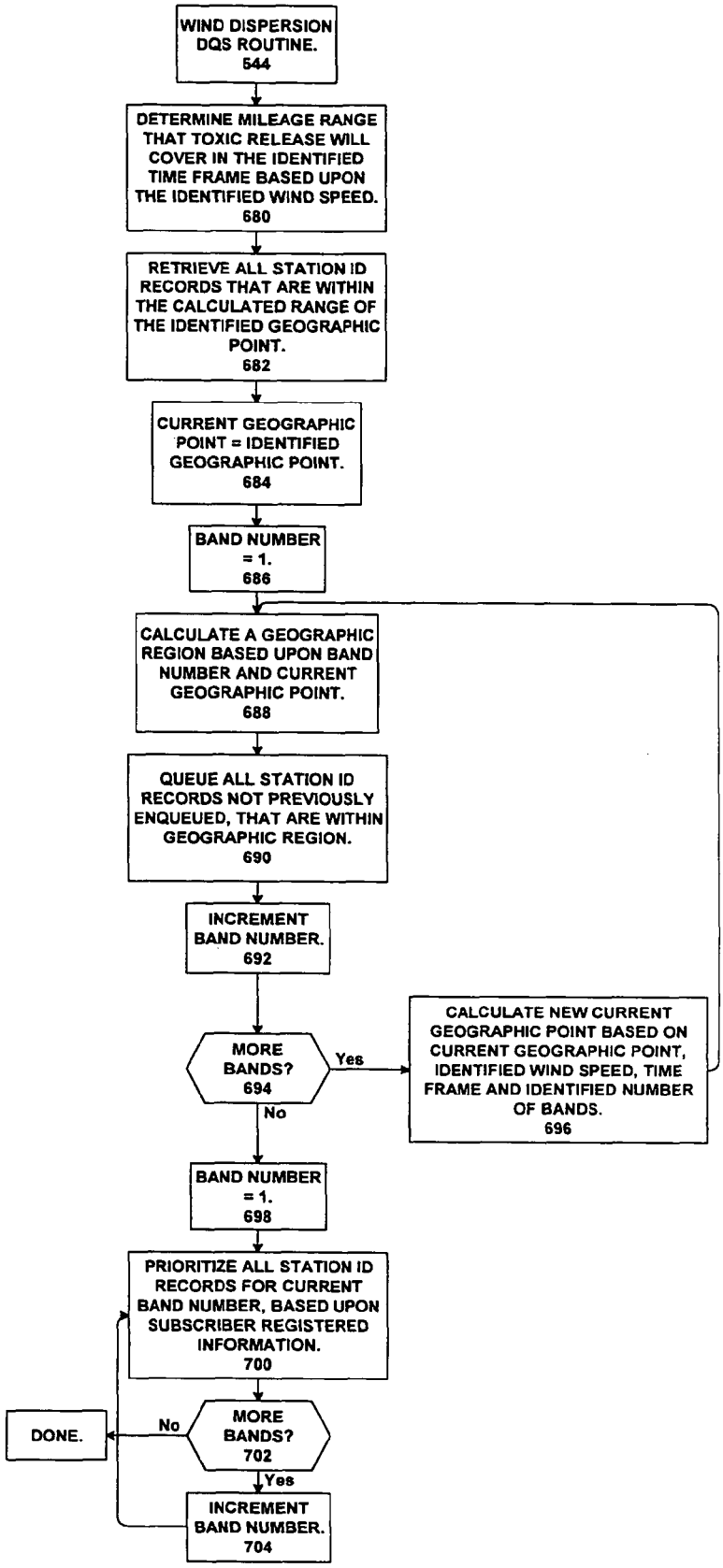

Referring now to FIGS. 10A and 10B, details of the wind dispersion process 544 of the database query system 112 can be elaborated. In this process, in the first step 680 a mileage range is computed, representing the range that a toxic release will cover in the identified time frame based upon the identified wind speed. Next, in step 682, all station identifiers for subscribers within the calculated range of the identified geographic point are retrieved. In step 684 and step 686, variables are initialized for a loop of steps 688, 690, 692, 694 and 696 in which station identifiers are selected from those retrieved in step 682. In step 684, a current geographic point is initialized to be the geographic point identified in the alert notification packet. In step 686, a band number is initialized to a value of one. Subsequently in step 688, a geographic region is calculated based upon the current band number and the current geographic point. This calculation involves wind dispersion formulas known in the art which identify areas in which a release at a given point will be dispersed, given a current wind direction and speed. Subsequently, in step 690, all station identifiers that have not been previously enqueued and that are within the identified geographic region are enqueued. Thereafter, in step 692 the current band number is incremented and in step 694 it is determined whether more bands are to be processed. If there are more bands to process, in step 696 a new current geographic point is computed from the previous geographic point, the identified wind speed, time frame and number of bands identified in the alert notification packet. Processing then returns to step 688 to complete another band.

After all bands have been processed, in step 698 the band number is again initialized to a value of one to permit prioritization through step 700, 702 and 704. In step 700, all station identifiers for current band number are prioritized based upon subscriber registered information. In step 702, it is determined whether there are additional bands. If so, in step 704 the current band number is incremented and processing returns to step 700 to prioritize station IDs for the new current band number. After all bands have been prioritized in this manner, processing is complete. These last three steps, 700, 702 and 704 permit all station identifiers to be prioritized such that station identifiers identified in a given band nearer to the source of the toxic release are prioritized first and prior to station identifiers identified in additional bands.

Figure 11:
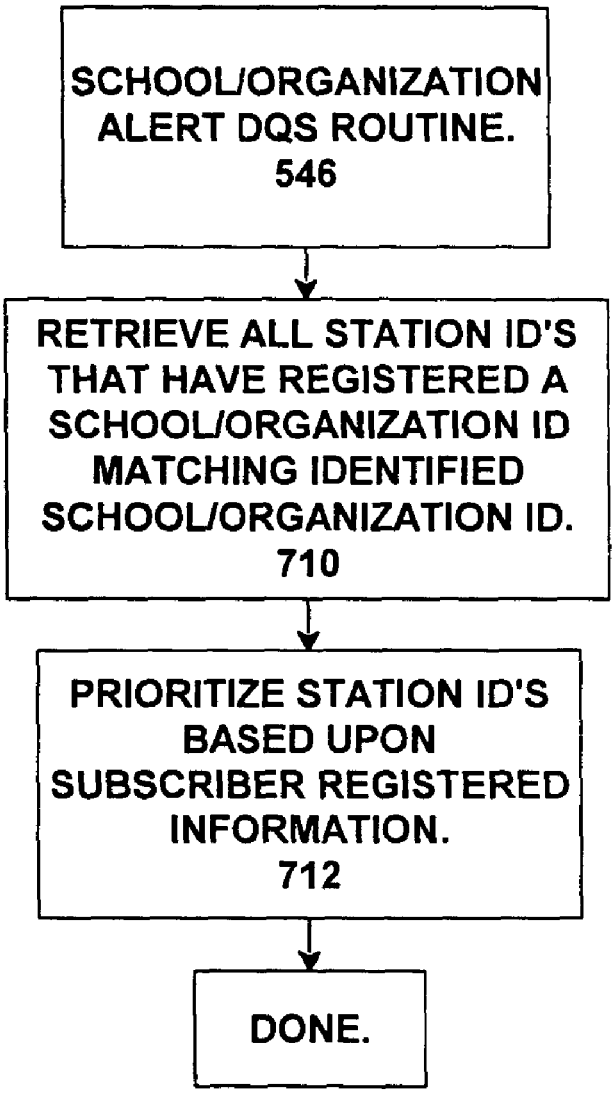
FIG. 11 is an illustration of specific operations performed by the Database Query System in handling a School/Organization alert.

Referring now to FIG. 11, details of the school or organization process 546 of the database query system 112 can be explained. In a first step 710, the school or organization identifier of the alert notification is used to locate station identifiers for all subscribers that have registered a matching school or organization identifier. In a second step 712, the retrieved station identifiers are prioritized based upon the subscribers' registered information and enqueued.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art.

For example, the location information found in the subscriber information tables of FIG. 3C need not be static. Several organizations have recently proposed technologies for tracking the movement of communication equipment such as cellular telephones. Technologies of this kind are described in U.S. Pat. Nos. 5,945,944, 5,663,734, 5,781,156, 5,825,327, 5,831,574, 5,841,396, 5,812,087, 5,874,914 and 5,884,214, all of which are hereby incorporated herein by reference in their entirety.

Consistent with principles of the present invention, the above-referenced technology may be utilized to dynamically update location information found in the subscriber information tables of FIG. 3C, to reflect the current position of a subscriber's cellular phone or other wireless communication device. Then if the subscriber's communication device is within a threatened area that has been identified in the manner described above, the subscriber will receive an alert notification in the manner described above.

Mobile wireless devices that can be tracked for the purposes of providing alert notifications are not limited to cellular telephones, but could also include personal digital assistant (PDA) devices, or laptop or palmtop computers having wireless communications capabilities. Furthermore, alerts may be delivered to the mobile wireless device via technologies other than voice telephone, such as via paging services (voice or text), or via Internet or e-mail communications as noted above.

The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A system for providing a message to a plurality of locations on a geographic basis, comprising:

a database storing a plurality of communications identifiers registered for persons using the system, the communications identifiers relating to modes of contact selected from the group consisting of:

i. voice or facsimile communication via a fixed or mobile telephone, ii. computer network messaging via electronic mail or Internet protocol messaging, and iii. voice or text messaging via a pager, personal digital assistant, laptop or palmtop computer, wherein at least one person is registered to communications identifiers representing two different modes of contact, a computer system responding to a command identifying a message to be provided to persons, by retrieving from said database, communications identifiers of said persons, establishing a communications connection using each retrieved communication identifier and delivering said message via said communications connection, wherein at least one person is contacted regarding said message via multiple communication identifiers.

2. The system of claim 1 wherein said computer system maintains a history record relating to an attempt to contact a person via a communication identifier, the history record indicating the results of the attempt.

3. The system of claim 1 wherein said database includes census information for persons using the system, the computer system utilizing the census information for persons using the system to customize the message provided to those persons.

4. The system of claim 1 wherein said communications identifiers are associated with geographic locations, and said system is located in a geographic location distant from at least some of the geographic locations identified within said database.

5. The system of claim 1 wherein said computer system comprises a host computer storing said database, and a host-controlled telephone switch for receiving telephone identifiers and audio messages from said host computer for delivery to said telephone identifiers.

6. The system of claim 1 wherein said communications identifiers are identifiers for use with a publicly switched telephonic communications system.

7. The system of claim 6 wherein said communications identifiers are telephone numbers.

8. The system of claim 7 wherein said telephone numbers comprise an area code, exchange number and telephone number.

9. The system of claim 8 wherein said telephone numbers further comprise a country code.

10. The system of claim 1 wherein said communications identifiers are electronic mail addresses for use with a computer network.

11. The system of claim 10 wherein said computer network is the Internet.

12. The system of claim 1 wherein said communications identifiers are Internet protocol addresses for use with an Internet protocol computer network.

13. The system of claim 12 wherein said computer network is the Internet.

14. The system of claim 1 wherein said computer system further comprises a threat identification system for receiving threat information, said threat identification system evaluating said threat information to identify a geographic area subject to a threat and in response generate said command identifying said geographic area and a warning related to the identified threat.

15. The system of claim 14 wherein said threat identification system identifies weather threats applicable to said geographic area.

16. The system of claim 15 wherein said threat identification system comprises an communications connection to a National Weather Service information service.

17. The system of claim 16 wherein said communications connection is an Internet connection, said threat identification system receiving text information describing weather conditions and comprising a parser for parsing said text information to identify weather threats and geographic areas to which said threats apply.

18. The system of claim 1 wherein said warning signal identifies a weather threat applicable to said geographic area.

19. The system of claim 18 wherein said warning signal warns of hazardous atmospheric conditions applicable to said geographic area.

20. The system of claim 19 wherein said warning signal warns of poor air quality in said geographic area.

21. The system of claim 19 wherein said warning signal warns of a toxic release in said geographic area.

22. The system of claim 19 wherein said warning signal warns of harmful radiation in said geographic area.

23. A system for providing an announcement to a plurality of persons, comprising:

a database storing a plurality of communications identifiers for persons to receive announcements, the communications identifiers relating to modes of contact selected from the group consisting of:

i. voice or facsimile communication via a fixed or mobile telephone, ii. computer network messaging via electronic mail or Internet protocol messaging, and iii. voice or text messaging via a pager, personal digital assistant, laptop or palmtop computer, wherein at least one person is registered to communications identifiers representing two different modes of contact, a computer system responding to a command identifying an announcement to be provided to persons, by retrieving from said database, communications identifiers of said persons, establishing a communications connection using each retrieved communication identifier and delivering said announcement via said communications connection, wherein at least one person is contacted regarding said message via multiple communication identifiers.

24. The system of claim 23 wherein said computer system maintains a history record relating to an attempt to contact a person via a communication identifier, the history record indicating the results of the attempt.

25. The system of claim 23 wherein said database includes census information for persons using the system, the computer system utilizing the census information for persons using the system to customize the announcement provided to those persons.

26. The system of claim 23 wherein said system is located in a geographic location distant from at least some of the persons identified within said database.

27. The system of claim 23 wherein said computer system comprises a host computer storing said database, and a host-controlled telephone switch for receiving telephone identifiers and audio messages from said host computer for delivery to said persons.

28. The system of claim 23 wherein said communications identifiers are identifiers for use with a publicly switched telephonic communications system.

29. The system of claim 28 wherein said communications identifiers are telephone numbers.

30. The system of claim 29 wherein said telephone numbers comprise an area code, exchange number and telephone number.

31. The system of claim 30 wherein said telephone numbers further comprise a country code.

32. The system of claim 23 wherein said communications identifiers are electronic mail addresses for use with a computer network.

33. The system of claim 32 wherein said computer network is the Internet.

34. The system of claim 23 wherein said communications identifiers are Internet protocol addresses for use with an Internet protocol computer network.

35. The system of claim 34 wherein said computer network is the Internet.

36. The system of claim 23 wherein said computer system further comprises an atmospheric threat identification system for receiving atmospheric threat information, said threat identification system evaluating said atmospheric threat information to identify persons subject to an atmospheric threat and in response generate said command identifying said announcement related to the identified threat.

37. The system of claim 36 wherein said threat identification system identifies weather threats.

38. The system of claim 37 wherein said threat identification system comprises an communications connection to a National Weather Service information service.

39. The system of claim 38 wherein said communications connection is an Internet connection, said threat identification system receiving text information describing weather conditions and comprising a parser for parsing said text information to identify weather threats.

40. The system of claim 23 wherein said announcement identifies a weather threat applicable to persons receiving the message.

41. The system of claim 40 wherein said warning signal warns of hazardous atmospheric conditions applicable to said geographic area.

42. The system of claim 41 wherein said warning signal warns of poor air quality in said geographic area.

43. The system of claim 41 wherein said warning signal warns of a toxic release in said geographic area.

44. The system of claim 41 wherein said warning signal warns of harmful radiation in said geographic area.

45. A system for providing announcements to a plurality of persons, comprising:

a database storing a plurality of communications identifiers, and associating each communications identifier with data useful for determining whether particular information is to be communicated to said communications identifier, the communications identifiers relating to modes of contact selected from the group consisting of:

i. voice or facsimile communication via a fixed or mobile telephone, ii. computer network messaging via electronic mail or Internet protocol messaging, and iii. voice or text messaging via a pager, personal digital assistant, laptop or palmtop computer, wherein at least one person is registered to communications identifiers representing two different modes of contact, a computer system responding to a command identifying an announcement to be announced to interested persons, by retrieving from said database, communications identifiers associated with persons to whom said announcement is to be communicated, establishing a communications connection using each retrieved communication identifier and delivering said announcement via said communications connection, wherein at least one person is contacted regarding said message via multiple communication identifiers.

46. The system of claim 45 wherein said computer system maintains a history record relating to an attempt to contact a person via a communication identifier, the history record indicating the results of the attempt.

47. The system of claim 45 wherein said database includes census information for persons using the system, the computer system utilizing the census information for persons using the system to customize the message provided to those persons.

48. The system of claim 45 wherein said system is located in a geographic location distant from at least some of the locations reached by the communications identifiers identified within said database.

49. The system of claim 45 wherein said computer system comprises a host computer storing said database, and a host-controlled telephone switch for receiving telephone identifiers and audio messages from said host computer for delivery to said telephone numbers.

50. The system of claim 45 wherein said communications identifiers are identifiers for use with a publicly switched telephonic communications system.

51. The system of claim 50 wherein said communications identifiers are telephone numbers.

52. The system of claim 51 wherein said telephone numbers comprise an area code, exchange number and telephone number.

53. The system of claim 52 wherein said telephone numbers further comprise a country code.

54. The system of claim 45 wherein said communications identifiers are electronic mail addresses for use with a computer network.

55. The system of claim 54 wherein said computer network is the Internet.

56. The system of claim 45 wherein said communications identifiers are Internet protocol addresses for use with an Internet protocol computer network.

57. The system of claim 56 wherein said computer network is the Internet.

58. The system of claim 45 wherein said computer system further comprises an atmospheric threat identification system for receiving atmospheric threat information, said threat identification system evaluating said atmospheric threat information to identify communications identifiers for locations subject to an atmospheric threat and in response generate said command identifying said announcement related to the identified threat.

59. The system of claim 58 wherein said threat identification system identifies weather threats.

60. The system of claim 59 wherein said threat identification system comprises an communications connection to a National Weather Service information service.

61. The system of claim 60 wherein said communications connection is an Internet connection, said threat identification system receiving text information describing weather conditions and comprising a parser for parsing said text information to identify weather threats.

62. The system of claim 45 wherein said atmospheric announcement identifies a weather threat applicable to persons receiving the message.

63. The system of claim 62 wherein said warning signal warns of hazardous atmospheric conditions applicable to said geographic area.

64. The system of claim 63 wherein said warning signal warns of poor air quality in said geographic area.

65. The system of claim 63 wherein said warning signal warns of a toxic release in said geographic area.

66. The system of claim 63 wherein said warning signal warns of harmful radiation in said geographic area.

67. The system of claim 45 wherein said announcement identifies unavailability of a public service at a particular time.

68. The system of claim 67 wherein said announcement identifies a school closing.

69. The system of claim 45 wherein said announcement identifies a traffic condition.

70. The system of claim 45 wherein said announcement identifies an unscheduled closing of a public place.

71. The system of claim 45 wherein said announcement identifies a change in a regularly scheduled activity.

72. The system of claim 71 wherein said regularly scheduled activity is the movements of a public transportation system.

73. The system of claim 71 wherein said regularly scheduled activity is the hours of business of a place of public accommodation.

*74. A method for providing a message to a plurality of locations on a geographic basis, comprising:*

*storing a plurality of communications identifiers registered for persons, the communications identifiers relating to modes of contact selected from the group consisting of:*

*i. voice or facsimile communication via a fixed or mobile telephone,*

*ii. computer network messaging via electronic mail or Internet protocol messaging, and*

*iii. voice or text messaging via a pager, personal digital assistant, laptop or palmtop computer,*

*wherein at least one person is registered to communications identifiers representing two different modes of contact,*

*responding to a command identifying a message to be provided to persons, by retrieving communications identifiers of said persons, establishing a communications connection using each retrieved communication identifier and delivering said message via said communications connection, wherein at least one person is contacted regarding said message via multiple communication identifiers.*

*75. The method of claim 74 further comprising maintaining a history record relating to an attempt to contact a person via a communication identifier, the history record indicating the results of the attempt.*

*76. The method of claim 74 further comprising utilizing census information for persons to customize the message provided to those persons.*

*77. The method of claim 74 wherein said communications identifiers are associated with geographic locations, the method being performed at a geographic location distant from at least some of the geographic locations identified within said database.*

*78. The method of claim 74 performed by a host computer delivering receiving telephone identifiers and audio messages to a host-controlled telephone switch for delivery to said telephone identifiers.*

*79. The method of claim 74 wherein said communications identifiers are identifiers for use with a publicly switched telephone communications system.*

*80. The method of claim 79 wherein said communications identifiers are telephone numbers.*

*81. The method of claim 80 wherein said telephone numbers comprise an area code, exchange number and telephone number.*

*82. The method of claim 81 wherein said telephone numbers further comprise a country code.*

*83. The method of claim 74 wherein said communications identifiers are electronic mail addresses for use with a computer network.*

*84. The method of claim 83 wherein said computer network is the Internet.*

*85. The method of claim 74 wherein said communications identifiers are Internet protocol addresses for use with an Internet protocol computer network.*

*86. The method of claim 85 wherein said computer network is the Internet.*

*87. The method of claim 74 further comprising receiving threat information, evaluating said threat information to identify a geographic area subject to a threat and in response generating a command identifying said geographic area and a warning related to the identified threat.*

*88. The method of claim 74 wherein said threat is a weather threat applicable to said geographic area.*

*89. The method of claim 88 wherein said threat information is received from a National Weather Service information service.*

*90. The method of claim 89 wherein said threat information is received via an Internet connection, and includes text information describing weather conditions, further comprising parsing said text information to identify weather threats and geographic areas to which said threats apply.*

*91. The method of claim 74 wherein said warning signal identifies a weather threat applicable to said geographic area.*

*92. The method of claim 91 wherein said warning signal warns of hazardous atmospheric conditions applicable to said geographic area.*

*93. The method of claim 92 wherein said warning signal warns of poor air quality in said geographic area.*

*94. The method of claim 92 wherein said warning signal warns of a toxic release in said geographic area.*

*95. The method of claim 92 wherein said warning signal warns of harmful radiation in said geographic area.*

*96. A method for providing an announcement to a plurality of persons, comprising:*

*storing a plurality of communications identifiers for persons to receive announcements, the communications identifiers relating to modes of contact selected from the group consisting of:*

*i. voice or facsimile communication via a fixed or mobile telephone,*

*ii. computer network messaging via electronic mail or Internet protocol messaging, and*

*iii. voice or text messaging via a pager, personal digital assistant, laptop or palmtop computer,*

*wherein at least one person is registered to communications identifiers representing two different modes of contact,*

*responding to a command identifying an announcement to be provided to persons, by retrieving from said database, communications identifiers of said persons, establishing a communications connection using each retrieved communication identifier and delivering said announcement via said communications connection, wherein at least one person is contacted regarding said message via multiple communication identifiers.*

*97. The method of claim 96 further comprising maintaining a history record relating to an attempt in contact a person via a communication identifier, the history record indicating the results of the attempt.*

*98. The method of claim 96 utilizing census information for persons to customize the announcement provided to those persons.*

*99. The method of claim 96 wherein said method is performed at a geographic location distant from at least some of the persons identified.*

*100. The method of claim 96 performed by a host computer delivering telephone identifiers and audio messages to a host-controlled telephone switch for delivery.*

*101. The method of claim 96 wherein said communications identifiers are identifiers for use with a publicly switched telephonic communications method.*

*102. The method of claim 101 wherein said communications identifiers are telephone numbers.*

*103. The method of claim 102 wherein said telephone numbers comprise an area code, exchange number and telephone number.*

*104. The method of claim 103 wherein said telephone numbers further comprise a country code.*

*105. The method of claim 96 wherein said communications identifiers are electronic mail addresses for use with a computer network.*

*106. The method of claim 105 wherein said computer network is the Internet.*

*107. The method of claim 96 wherein said communications identifiers are Internet protocol addresses for use with an Internet protocol computer network.*

*108. The method of claim 107 wherein said computer network is the Internet.*

*109. The method of claim 96 further comprising receiving an atmospheric threat identification, evaluating said atmospheric threat information to identify persons subject to an atmospheric threat and in response generating said command identifying said announcement related to the identified threat.*

*110. The method of claim 109 wherein said threat identification method identifies weather threats.*

*111. The method of claim 110 wherein said threat identification is received from a National Weather Service information service.*

*112. The method of claim 111 wherein said threat information is received via an Internet connection, and includes text information describing weather conditions, further comprising parsing said text information to identify weather threats.*

*113. The method of claim 96 wherein said announcement identifies a weather threat applicable to persons receiving the message.*

*114. The method of claim 113 wherein said warning signal warns of hazardous atmospheric conditions applicable to said geographic area.*

*115. The method of claim 114 wherein said warning signal warns of poor air quality in said geographic area.*

*116. The method of claim 114 wherein said warning signal warns of a toxic release in said geographic area.*

*117. The method of claim 114 wherein said warning signal warns of harmful radiation in said geographic area.*

*118. A method for providing announcements to a plurality of persons, comprising:*

*storing a plurality of communications identifiers, and associating each communications identifier with data useful for determining whether particular information is to be communicated to said communications identifier, the communications identifiers relating to modes of contact selected from the group consisting of:*

*i. voice or facsimile communication via a fixed or mobile telephone,*

*ii. computer network messaging via electronic mail or Internet protocol messaging, and*

*iii. voice or text messaging via a pager, personal digital assistant, laptop or palmtop computer,*

*wherein at least one person is registered to communications identifiers representing two different modes of contact,*

*responding to a command identifying an announcement to be announced to interested persons, by retrieving from said database, communications identifiers associated with persons to whom said announcement is to be communicated, establishing a communications connection using each retrieved communication identifier and delivering said announcement via said communications connection, wherein at least one person is contacted regarding said message via multiple communication identifiers.*

*119. The method of claim 118 wherein said computer method maintains a history record relating to an attempt to contact a person via a communication identifier, the history record indicating the results of the attempt.*

*120. The method of claim 118 utilizing census information for persons to customize the message provided to those persons.*

*121. The method of claim 118 wherein said method is performed at a geographic location distant from at least some of the locations reached by the communications identifiers.*

*122. The method of claim 118 performed by a host computer delivering telephone identifiers and audio messages to a host-controlled telephone switch for delivery.*

*123. The method of claim 118 wherein said communications identifiers are identifiers for use with a publicly switched telephonic communications method.*

*124. The method of claim 123 wherein said communications identifiers are telephone numbers.*

*125. The method of claim 124 wherein said telephone numbers comprise an area code, exchange number and telephone number.*

*126. The method of claim 125 wherein said telephone numbers further comprise a country code.*

*127. The method of claim 118 wherein said communications identifiers are electronic mail addresses for use with a computer network.*

*128. The method of claim 127 wherein said computer network is the Internet.*

*129. The method of claim 118 wherein said communications identifiers are Internet protocol addresses for use with an Internet protocol computer network.*

*130. The method of claim 129 wherein said computer network is the Internet.*

*131. The method of claim 118 further comprising receiving atmospheric threat information, evaluating said atmospheric threat information to identify communications identifiers for locations subject to an atmospheric threat and in response generating said command identifying said announcement related to the identified threat.*

*132. The method of claim 131 wherein said threat identification method identifies weather threats.*

*133. The method of claim 132 wherein said threat identification is received from a National Weather Service information service.*

*134. The method of claim 133 wherein said threat information is received via an Internet connection, and includes text information describing weather conditions, further comprising parsing said text information to identify weather threats.*

*135. The method of claim 118 wherein said atmospheric announcement identifies a weather threat applicable to persons receiving the message.*

*136. The method of claim 135 wherein said warning signal warns of hazardous atmospheric conditions applicable to said geographic area.*

*137. The method of claim 136 wherein said warning signal warns of poor air quality in said geographic area.*

*138. The method of claim 136 wherein said warning signal warns of a toxic release in said geographic area.*

*139. The method of claim 136 wherein said warning signal warns of harmful radiation in said geographic area.*

*140. The method of claim 118 wherein said announcement identifies unavailability of a public service at a particular time.*

*141. The method of claim 140 wherein said announcement identifies a school closing.*

*142. The method of claim 118 wherein said announcement identifies a traffic condition.*

*143. The method of claim 118 wherein said announcement identifies an unscheduled closing of a public place.*

*144. The method of claim 118 wherein said announcement identifies a change in a regularly scheduled activity.*

*145. The method of claim 144 wherein said regularly scheduled activity is the movements of a public transportation method.*

*146. The method of claim 144 wherein said regularly scheduled activity is the hours of business of a place of public accommodation.*

* * * * *